United States Patent
Yamaoka et al.

(10) Patent No.: US 7,055,495 B2
(45) Date of Patent: Jun. 6, 2006

(54) COMPRESSION IGNITION INTERNAL COMBUSTION ENGINE

(75) Inventors: Shiro Yamaoka, Hitachi (JP); Minoru Oosuga, Hitachinaka (JP); Toshiharu Nogi, Hitachinaka (JP); Takuya Shiraishi, Hitachinaka (JP); Yuusuke Kihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/812,983

(22) Filed: Mar. 31, 2004

(65) Prior Publication Data

US 2004/0177830 A1    Sep. 16, 2004

Related U.S. Application Data

(63) Continuation of application No. 10/478,352, filed as application No. PCT/JP01/04271 on May 22, 2001.

(51) Int. Cl.
  *F02B 5/00*    (2006.01)
  *F02M 51/00*   (2006.01)

(52) U.S. Cl. ............ 123/305; 123/399; 123/531

(58) Field of Classification Search ........ 123/299, 123/300, 305, 399, 531, 525–527, 431; 701/103–105
See application file for complete search history.

(56) References Cited

U.S. PATENT DOCUMENTS

| | | | |
|---|---|---|---|
| 6,267,097 B1 * | 7/2001 | Urushihara et al. | 123/305 |
| 6,336,436 B1 * | 1/2002 | Miyakubo et al. | 123/295 |
| 6,341,487 B1 * | 1/2002 | Takahashi et al. | 60/286 |
| 6,352,491 B1 * | 3/2002 | Mashiki et al. | 477/107 |
| 6,499,456 B1 * | 12/2002 | Nogi et al. | 123/295 |
| 6,739,295 B1 * | 5/2004 | Yamaoka et al. | 123/90.15 |
| 6,772,585 B1 * | 8/2004 | Iihoshi et al. | 60/277 |

FOREIGN PATENT DOCUMENTS

| | | |
|---|---|---|
| DE | 19801245 | 7/1999 |
| DE | 19810935 | 9/1999 |
| JP | 49-47922 | 12/1974 |
| JP | 64-56964 | 3/1989 |
| JP | 08312394 | 11/1996 |
| JP | 9-53485 | 2/1997 |
| JP | 10-056412 | 2/1998 |
| JP | 10-56413 | 2/1998 |
| JP | 10-196424 | 7/1998 |
| JP | 10-238374 | 9/1998 |
| JP | 10-252476 | 9/1998 |
| JP | 11-107820 | 4/1999 |
| JP | 11336600 | 12/1999 |
| JP | 2000-64876 | 2/2000 |
| JP | 2000-179369 | 6/2000 |
| JP | 2000-192828 | 7/2000 |

* cited by examiner

*Primary Examiner*—Hai Huynh
(74) *Attorney, Agent, or Firm*—Crowell & Moring LLP

(57) ABSTRACT

A compression ignition internal combustion engine includes a combustion chamber, an intake valve 19a, intake port 6, and an exhaust valve 19b. The temperature and pressure in the combustion chamber are increased to self-ignite an air-fuel mixture with the compressive operation of a piston after closing of the intake valve 19a. A fuel injection valve 11 injects pressurized air, serving as an ignition trigger factor, directly into the combustion chamber so that the air-fuel mixture under the expansion stroke of the piston is brought into an ignitable state. An ECU 1 controls the injection timing of the pressurized air depending on the ignition timing. The self-ignition timing can be controlled to a proper timing in a wide engine operating range with respect to a load and a revolution speed without changing the shape of the combustion chamber to a large extent.

4 Claims, 22 Drawing Sheets

COMPRESSION IGNITION INTERNAL COMBUSTION ENGINE

TECHNICAL FIELD

The present invention relates to a compression ignition internal combustion engine in which an air-fuel pre-mixture supplied to a combustion chamber is self-ignited with the compressive operation of a piston. More particularly, the present invention relates to a compression ignition internal combustion engine in which the self-ignition timing of an air-fuel mixture can properly be controlled in a wide engine operating range.

BACKGROUND ART

JP,A 10-56413 discloses one known example of a compression ignition internal combustion engine employing a combustion mode in which an air-fuel pre-mixture supplied to a combustion chamber is self-ignited with the compressive operation of a piston. The compression ignition internal combustion engine can realize the engine operation in an ultra lean range (at an air-fuel ratio of 80 or more), which has not been realized with gasoline and diesel engines in the past. Also, the compression ignition internal combustion engine can realize combustion that is ignitable at a lower flame temperature and by a uniform air-fuel mixture. It is hence possible to achieve a substantial reduction of both NOx and soot at the same time.

Generally, when an air-fuel pre-mixture is compressed and reaches a certain temperature, the so-called "low-temperature oxidation reaction" begins with dehydrogenation of hydrocarbon, i.e., fuel, which serves as a start reaction. The progress of the low-temperature oxidation reaction causes self-ignition via an elementary reaction called a blue flame. Since this self-ignition occurs simultaneously at multiple points in the air-fuel mixture, a period of resulting combustion is much shorter when looking at the whole of a combustion chamber than a period of combustion caused by spark ignition in a conventional gasoline engine or a period of spray combustion caused in a conventional diesel engine. That feature is effective in suppressing generation of NOx which depends on the flame temperature and a duration thereof, and hence functions as a factor for realizing a reduction of NOx in the compression ignition internal combustion engine.

However, the known compression ignition internal combustion engine has problems as follows. In the known engine, when the engine is operated with compression ignition, the pressure and temperature of a mixture of fuel and air are increased so as to promote chemical reactions and to cause self-ignition with the compressive operation of a piston after closing of an intake valve. Accordingly, if an adiabatic compression condition, for example, of the air-fuel mixture changes with, e.g., fluctuations of the engine operating condition, the ignition timing is varied and a misfire is caused, thus resulting in a problem that it is difficult to perform the normal engine operation. Another problem has been experienced in that, because the self-ignition of the air-fuel mixture is affected by not only the temperature and pressure in the combustion chamber, but also by an air-fuel ratio of the air-fuel mixture, the ignition timing is also changed depending on a fuel diffusion state in the combustion chamber, thus resulting in a cycle variation and a torque variation among cylinders.

In view of those problems, as disclosed in, e.g., JP,A 10-196424, there is proposed a compression ignition internal combustion engine in which a control piston serving as auxiliary compression means is disposed in the combustion chamber and the control piston is operated near the top dead center to reduce the capacity of the combustion chamber and to transiently raise the temperature of the air-fuel mixture, thereby controlling the ignition timing of the air-fuel mixture.

DISCLOSURE OF THE INVENTION

In the internal combustion engine disclosed in JP,A 10-196424, however, because an increase in the temperature and pressure in the combustion chamber is controlled by additionally providing the control piston to vary the capacity of the combustion chamber, problems arise in that a resulting substantial modification in shape of the engine brings about a more complicated system, poor mountability on a vehicle, and a cost increase.

An object of the present invention is to provide a compression ignition internal combustion engine in which the self-ignition timing of an air-fuel mixture can properly be controlled in a wide engine operating range with respect to a load and a revolution speed without changing the shape of the combustion chamber to a large extent.

To achieve the above object, the present invention provides a compression ignition internal combustion engine comprising a combustion chamber to which air and fuel are supplied, an intake valve for opening and closing a passage between the combustion chamber and an intake port communicating with the combustion chamber, and an exhaust valve for opening and closing a passage between the combustion chamber and an exhaust port communicating with the combustion chamber, the temperature and pressure in the combustion chamber being increased to self-ignite an air-fuel mixture with the compressive operation of a piston after closing of the intake valve, wherein the compression ignition internal combustion engine further comprises ignition-trigger-factor injecting means for injecting an ignition trigger factor directly into the combustion chamber at an arbitrary timing in a state in which the intake valve and the exhaust valve are closed, depending on operating conditions of the compression ignition internal combustion engine so that an air-fuel mixture under a compression or expansion stroke of the piston is brought into an ignitable state, and control means for controlling at least one of an injection timing, an injection amount, and an injection pressure of the ignition trigger factor depending on the operating conditions.

With that construction, the self-ignition timing can be controlled to a proper timing in a wide engine operating range with respect to a load and a revolution speed without changing the shape of the combustion chamber to a large extent.

BEST MODE FOR CARRYING OUT THE INVENTION

The construction and the operation of a compression ignition internal combustion engine according to a first embodiment of the present invention will be described below with reference to FIGS. 1 to 8.

First, the construction of the compression ignition internal combustion engine according to this embodiment will be described below with reference to FIGS. 1 and 2.

Figure 1:
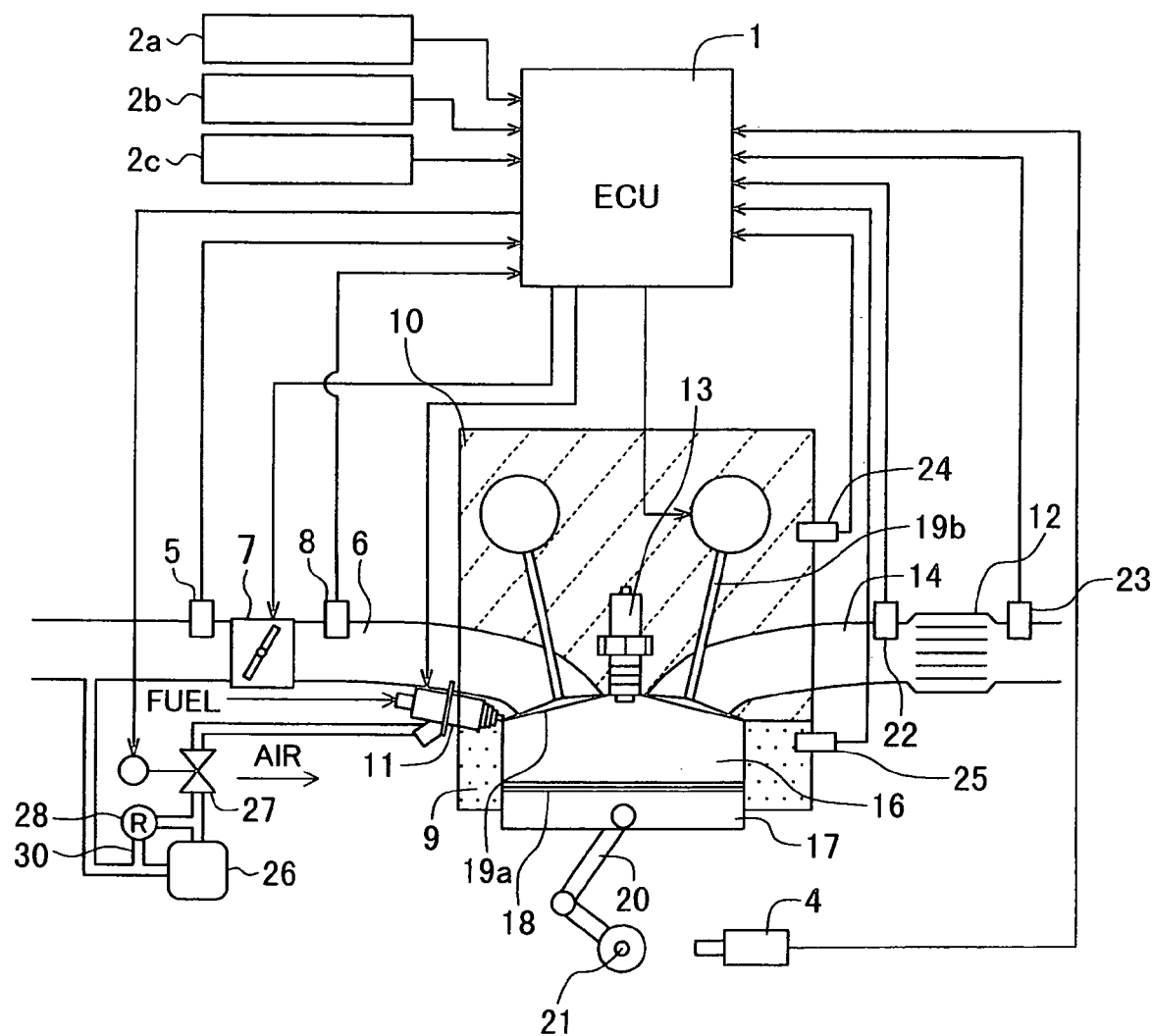
FIG. 1 is a block diagram showing the construction of a compression ignition internal combustion engine according to a first embodiment of the present invention.
Figure 2:
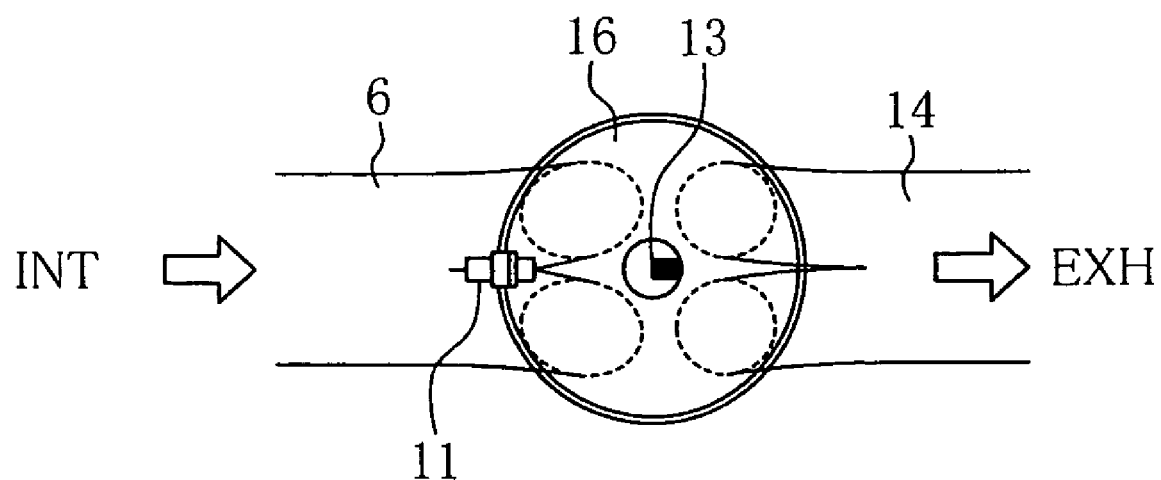
FIG. 2 is a plan view showing the construction of a combustion chamber and thereabout in the compression ignition internal combustion engine according to the first embodiment of the present invention.

FIG. 1 is a block diagram showing the construction of the compression ignition internal combustion engine according to the first embodiment of the present invention, and FIG. 2 is a plan view showing the construction of a combustion chamber and thereabout in the compression ignition internal combustion engine according to the first embodiment of the present invention.

As shown in FIG. 1, an intake port 6 and an exhaust port 14 are communicated with a combustion chamber 16 that is surrounded by a cylinder block 9, a piston 17 and a cylinder head 10. An intake valve 19a is disposed in a joint portion between the combustion chamber 16 and the intake port 6 to open and close a passage communicating with the combustion chamber 16. An exhaust valve 19b is disposed in a joint portion between the combustion chamber 16 and the exhaust port 14 to open and close a passage communicating with the combustion chamber 16. As shown in FIG. 2, the intake port 6 is connected to the combustion chamber 16 after being branched into two passages, and the intake valve 19a is disposed in a joint portion of each branched passage with the combustion chamber 16. Likewise, the exhaust port 14 is connected to the combustion chamber 16 after being branched into two passages, and the exhaust valve 19b is disposed in a joint portion of each branched passage with the combustion chamber 16. A reciprocating motion of the piston 17 is transmitted to a crankshaft 21 through a connecting rod 20 for thereby rotating the crankshaft 21.

An ignition plug 13 is disposed to face the combustion chamber 16, and a spark is discharged from the ignition plug 13 when spark ignition combustion is instructed from an engine control unit (ECU) 1. Also, when compression ignition combustion is instructed from the ECU 1, the ignition plug 13 is able to function as an ion current detector for detecting a combustion state. In such a case, the ignition plug 13 monitors the combustion state and the ignition timing in the combustion chamber 16. However, when the combustion is performed by compression ignition all over the operating range, i.e., by only the compressive operation of the piston, without employing the ignition plug 13, it is no longer required to install the ignition plug 13. While the ignition plug 13 is disposed in a central top portion of the combustion chamber 16 in FIG. 2, the installed position of the ignition plug 13 is not particularly limited to the illuminated one.

The ECU 1 takes in successively output values of an accelerator opening detector 2a and a brake depressing force detector 2b both serving as driver's intention detecting means for detecting the intention of a driver driving a vehicle in which the compression ignition internal combustion engine of this embodiment is equipped, an output value of a vehicle speed detector 2c serving as vehicle traveling-state detecting means for detecting a vehicle traveling state, as well as respective output values of an airflow sensor 5, an engine cooling-water temperature sensor 24, an air-fuel ratio sensor 22, a behind-catalyst exhaust temperature sensor 23 mounted behind a catalyst 12, a crank angle sensor 4, and a knock sensor 25, which serve to detect the engine operating conditions. In this connection, the airflow sensor 5 preferably has the additional function of measuring an intake air temperature, and a resulting output value is also taken into the ECU 1 at the same time.

In this embodiment, an engine target torque is estimated from both the output value of the accelerator opening detector 2a and the vehicle speed. As means for obtaining an acceleration of the vehicle in which the compression ignition internal combustion engine is equipped, this embodiment employs a differential value of a signal from the vehicle speed sensor mounted on the vehicle. As an alternative, it is also possible to install an acceleration sensor on the vehicle and to employ an output value of the acceleration sensor. Further, while this embodiment employs, as the output value of the brake depressing force detector 2b, an ON/OFF signal for determining whether the driver has depressed a brake pedal, a brake depressing force sensor may be disposed behind the brake pedal and its output value may be used. Alternatively, a braking force imposed from the driver may be measured by installing an oil pressure sensor in a hydraulic pipe for the brake.

A fuel injection valve 11 is installed to be able to directly inject fuel into the combustion chamber 16. As shown in FIG. 2, the fuel injection valve 11 is disposed between the branched intake ports 6. While the fuel injection valve 11 is illustrated to position near an inner surface of the combustion chamber 16 in the vicinity of the intake valve 19a, the installed position is not limited to such a particular one, and the fuel injection valve 11 may be installed in any other suitable position enabling fuel to be injected into the combustion chamber 16.

In this embodiment, the fuel injection valve 11 is an air assisted injector capable of injecting two fluids, i.e., air and fuel. Stated another way, the fuel injection valve 11 is constructed to be able to selectively inject only fuel, only air, or both of fuel and air at the same time. Thus, a fuel system and an air system are guided to the fuel injection valve 11 constructed as an air assisted injector. An air pump 26 has a structure capable of always supplying an air pressure of not lower than 5 MPa to the fuel injection valve 11. A pressure regulator 28 is disposed in a bypass passage 30 bypassing the air pump 26 and controls an air pressure fed to the fuel injection valve 11. The pressure regulator 28 controls the air pressure depending on the engine operating conditions and the pressure in the cylinder. A solenoid valve 27 is operated to open and close in response to a control signal from the ECU 1 for thereby controlling an air amount fed to the fuel injection valve 11. With such an arrangement, any desired air pressure, air amount, fuel pressure and fuel amount can be supplied to the fuel injection valve 11 and then into the combustion chamber 16 depending on the engine operating conditions.

A method for controlling the compression ignition internal combustion engine according to this embodiment will next be described with reference to FIGS. 3 and 4.

Figure 3:
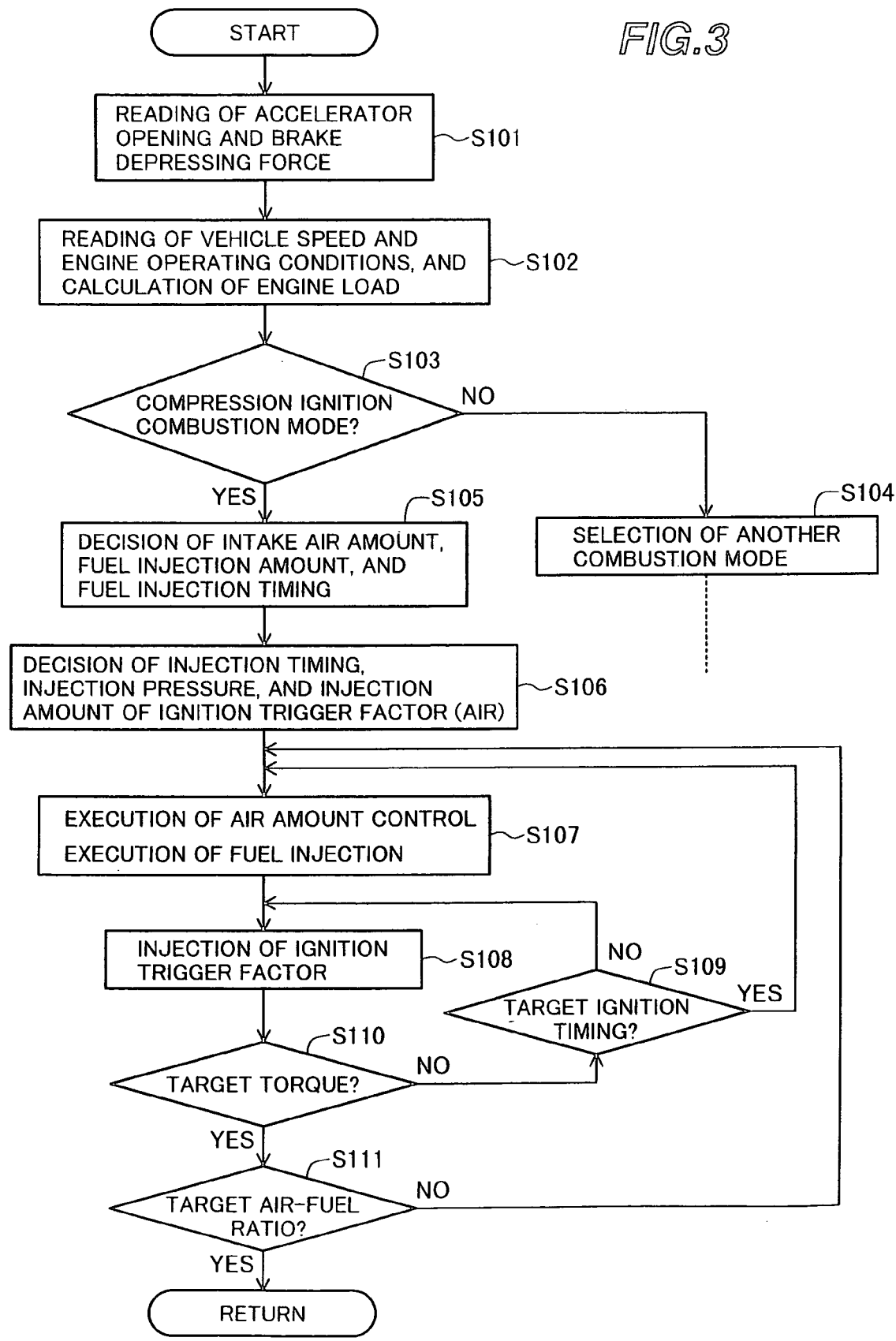
FIG. 3 is a flowchart showing an ignition control method for the compression ignition internal combustion engine according to the first embodiment of the present invention.
Figure 4:
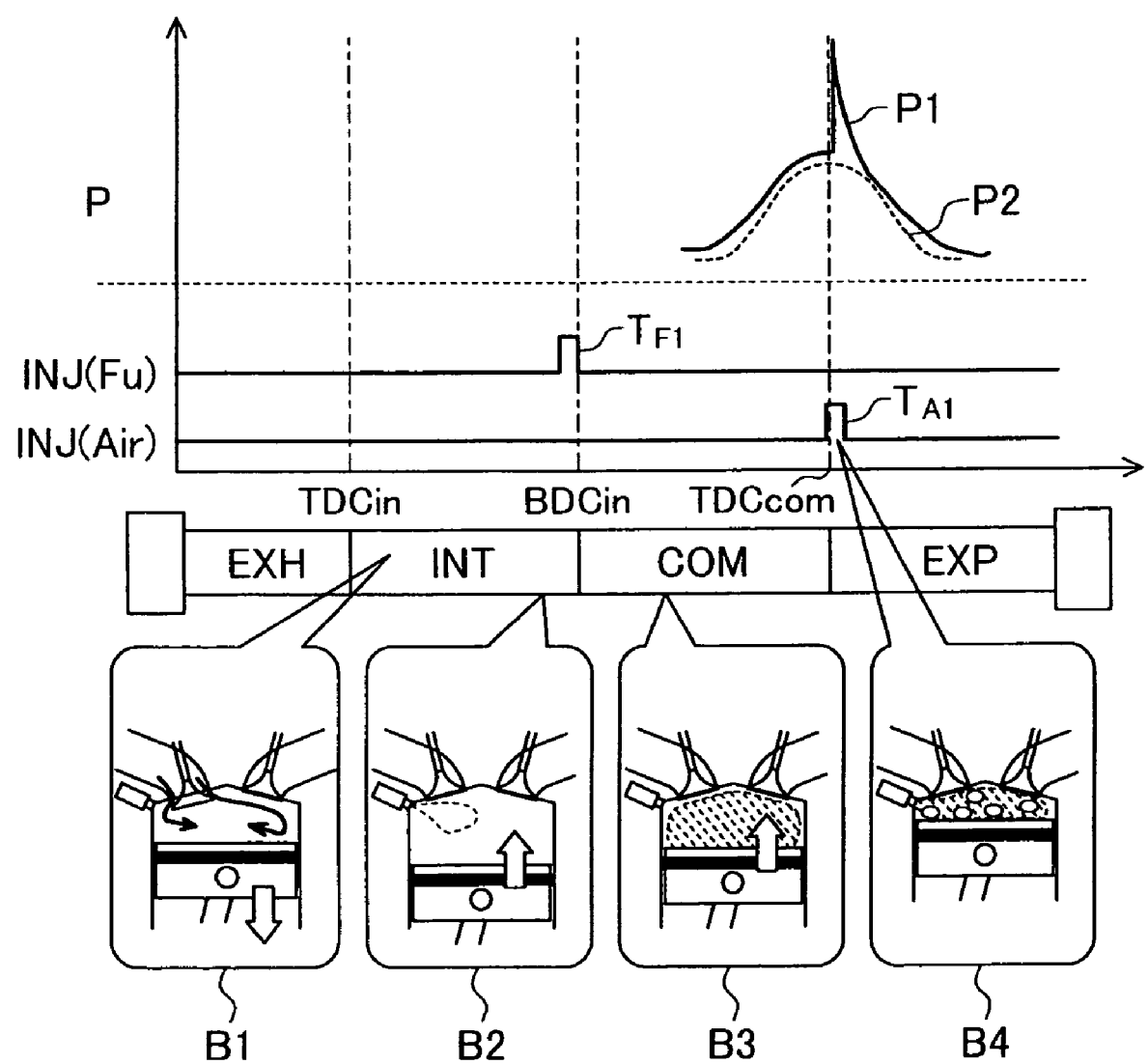
FIG. 4 is an explanatory view for explaining the operation of the compression ignition internal combustion engine according to the first embodiment of the present invention.

FIG. 3 is a flowchart showing an ignition control method for the compression ignition internal combustion engine according to the first embodiment of the present invention, and FIG. 4 is an explanatory view for explaining the operation of the compression ignition internal combustion engine according to the first embodiment of the present invention.

During the engine operation, the ECU 1 first reads in step S101 an accelerator opening from the output value of the accelerator opening detector 2a and a brake depressing force from the output value of the brake depressing force detector 2b, thereby reading the intention of the driver driving the vehicle in which the compression ignition internal combustion engine is equipped.

Then, in step S102, the ECU 1 reads the output value of the vehicle speed detector 2c to detect the vehicle traveling condition. Also, the ECU 1 reads the respective output values of the airflow sensor 5, the engine cooling-water temperature sensor 24, the air-fuel ratio sensor 22, the behind-catalyst exhaust temperature sensor 23 mounted behind the catalyst 12, the crank angle sensor 4, the knock sensor 25, etc. to detect the engine operating conditions. Based on the vehicle traveling condition and the engine operating conditions thus detected, the ECU 1 calculates an engine load.

Then, in step S103, the ECU 1 determines, based on the driver's intention read in step S101 and the engine target torque calculated in step S102, whether the operation caused by the compression ignition is enabled.

If it is determined in step S103 that the operation caused by the compression ignition is disabled, the ECU 1 proceeds to step S104 in which various engine parameters are controlled so as to perform, for example, spark ignition combustion when the engine is a spark ignition engine, or spray combustion when the engine is a diesel engine having no ignition plug.

On the other hand, if it is determined in step S103 that the operation caused by the compression ignition is enabled, the engine is controlled in the compression ignition combustion mode through steps subsequent to step S105.

If the engine operation in the compression ignition combustion mode is selected, the ECU 1 reads and decides, in step S105, the intake air amount, the fuel injection amount, and the fuel injection timing depending on the current engine operating conditions in accordance with a map stored in the ECU 1 beforehand.

Then, in step S106, the ECU 1 decides the injection amount, the injection pressure and the injection timing of air that is an ignition trigger factor.

A description is now made of the ignition trigger factor with reference to FIG. 4. In FIG. 4, the horizontal axis represents successive strokes of the internal combustion engine, i.e., an exhaust stroke EXH, an intake stroke INT, a compression stroke COM, and an expansion stroke EXP, while the vertical axis represents a combustion chamber pressure P, fuel injection timing INJ(Fu), and pressurized air injection timing INJ(Air) in respective zones. The fuel injection timing $T_{F1}$ is near the intake bottom dead point BDCin and is decided in step S105. Also, in this embodiment, pressurized air is injected from the fuel injection valve near the compression top dead center TDCcom. The injection timing, the injection amount and the injection pressure of the pressurized air are decided in step S106.

As indicated by a balloon B1, fresh air is supplied to the combustion chamber 16 in the intake stroke. Then, as indicated by a balloon B2, fuel is injected from the fuel injection valve at the fuel injection timing INJ(Fu) near the intake bottom dead point BDCin. As indicated by a balloon B3, the injected fuel is diffused in the combustion chamber 16 to form an air-fuel pre-mixture. At this time, the temperature, the air-fuel ratio and the engine compression ratio of the air-fuel pre-mixture are set such that self-ignition will not start at their setting values before the top dead center. To the air-fuel pre-mixture compressed by the piston to a certain extent, as indicated by a balloon B4, the pressurized air is injected from the fuel injection valve at the pressurized air injection timing INJ(Air) near the compression top dead center TDCcom. This pressurized air serves as the ignition trigger factor. With the injection of the pressurized air, the pressure P in the combustion chamber 16 rises abruptly, as indicated by a solid line P1, to such an extent as reaching the temperature and pressure conditions under which the air-fuel pre-mixture is ignitable, whereupon ignition occurs. On that occasion, the pressure of the injected pressurized air is regulated by the air pump 26 and the regulator 28 so as to have a value higher than the pressure in the combustion chamber 16. The amount of the injected pressurized air is decided in accordance with a signal from the ECU 1.

Then, in step S107, the ECU 1 executes fuel injection control and air amount control to modify the various parameters so that the fuel injection condition and the air amount condition decide as mentioned above are satisfied.

Subsequently, when the piston comes to the vicinity of the compression top dead center and the compressive operation reaches the timing of injecting the ignition trigger factor, the ECU 1 regulates the air pressure and injects the regulated air into the combustion chamber 16 in step S108.

Then, in step S110, the ECU 1 estimates, from the current accelerator opening, whether the torque generated at that time reaches the demanded torque. If the estimated value does not reach the target torque, the ECU 1 proceeds to step S109, and if it reaches the target torque, the ECU 1 proceeds to step S111.

If the target torque is not reached, the ECU 1 further determines in step S109 whether the ignition timing is normal. Means for detecting the ignition timing is implemented by detecting an ion current generated between electrodes of the ignition plug, or by employing the output value of the knock sensor 25. As an alternative, a pressure sensor for monitoring the pressure history in the combustion chamber 16 may be mounted on the compression ignition internal combustion engine and its output signal may be used to make the above determination.

If the ignition timing is not normal, the ECU 1 returns to step S108 in which the injection amount, the injection pressure and the injection timing of the ignition trigger factor are subjected to feedback control so that the ignition timing becomes normal.

If the ignition timing is normal, but the target torque is not reached, the ECU 1 returns to step S107 in which the fuel injection amount, the injection timing, and the intake air amount are subjected to feedback control so that the target torque is achieved.

Also, if it is determined in step S110 that the engine target torque is reached, the ECU 1 determines in step S111 whether the target air-fuel ratio is reached. Means for detecting the air-fuel ratio in this step is implemented by the air-fuel ratio sensor 22 shown in FIG. 1, and the output value of the air-fuel ratio sensor 22 is used to determine the air-fuel ratio during the engine operation.

If the target air-fuel ratio is not reached, the ECU 1 returns to step S107 in which the intake air amount and the fuel injection amount are subjected to feedback control.

If the target air-fuel ratio is reached, the control process is brought to an end. By realizing the target air-fuel ratio as described above, the exhaust cleaning efficiency of the catalyst 12, shown in FIG. 1, can be controlled to an optimum value.

The injection control of the ignition trigger factor can be executed by the feedback control of the ignition timing, for example, as illustrated. Alternatively, it is also possible to perform the operation based on only the control using the map recorded in the ECU 1.

With this embodiment, as described above, the pressurized air is injected near the compression top dead center to increase a charging rate in the combustion chamber, whereby the temperature and pressure of the air-fuel mixture during the compressive operation of the piston are increased to trigger the ignition. Thus, the compression ignition is enabled even in a lean air-fuel state. Consequently, the self-ignition timing can be controlled to a proper timing in a wide engine operating range with respect to a load and a revolution speed without changing the shape of the combustion chamber to a large extent.

The construction and the operation of a compression ignition internal combustion engine according to a modification of the first embodiment of the present invention will be described below with reference to FIG. 5.

The construction of the compression ignition internal combustion engine according to this embodiment is similar to that shown in FIG. 1. Also, the construction of a combustion chamber and thereabout in the compression ignition internal combustion engine according this embodiment is similar to that shown in FIG. 2.

Figure 5:
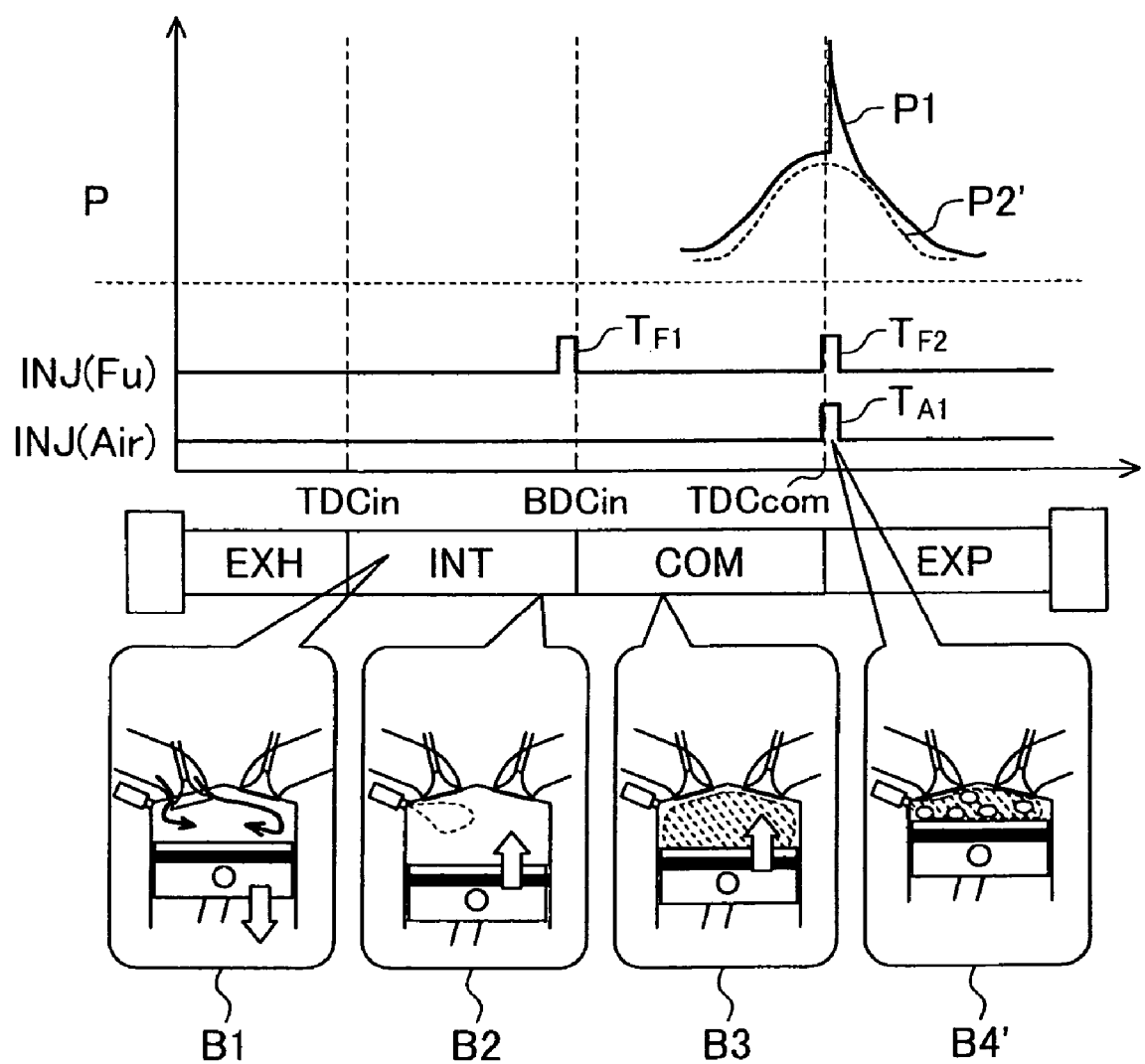
FIG. 5 is an explanatory view for explaining the operation of a compression ignition internal combustion engine according to a modification of the first embodiment of the present invention.

FIG. 5 is an explanatory view for explaining the operation of the compression ignition internal combustion engine according to a modification of the first embodiment of the present invention. It is to be noted that the same characters as those in FIG. 4 denote the same parts.

In this embodiment, the ignition trigger factor is provided by injecting both the pressurized air and the fuel at the same time, as indicated by a balloon B4', instead of injecting only the pressurized air as described above with reference to FIG. 4. To the air-fuel pre-mixture compressed by the piston to a certain extent, as indicated by the balloon B4', the pressurized air is injected from the fuel injection valve at the pressurized air injection timing INJ(Air) near the compression top dead center TDCcom, and the fuel is also injected from the fuel injection valve at the fuel injection timing INJ(Fu). Those pressurized air and fuel serve as the ignition trigger factors. With the injection of the pressurized air and the fuel, the pressure P in the combustion chamber 16 rises abruptly, as indicated by a solid line P1, to such an extent as reaching the temperature and pressure conditions under which the air-fuel pre-mixture is ignitable, whereupon ignition occurs.

A flowchart showing an ignition control method for the compression ignition internal combustion engine according to this embodiment is similar to that shown in FIG. 3. In step S106, however, the ECU 1 decides the injection amount, the injection pressure and the injection timing for each of air and fuel, i.e., the ignition trigger factors. Then, when the piston comes to the vicinity of the compression top dead center and the compressive operation reaches the timing of injecting the ignition trigger factors, the ECU 1 injects the air and the fuel into the combustion chamber in step S108. If it is determined in step S110 that the generated torque does not reach the target torque and it is determined in step S109 that the ignition timing is not normal, the ECU 1 returns to step S108 in which the injection amount, the injection pressure and the injection timing of each ignition trigger factor are subjected to feedback control so that the ignition timing becomes normal.

With this embodiment, since the injection control of the pressurized air is likewise performed near the compression top dead center, the same ignition control effect as that obtainable with FIG. 3 can be obtained. Further, since the air-fuel ratio in the spray is adjusted by controlling the amount and pressure of the injected fuel in addition to the air injection, it is possible to control not only the ignition timing, but also the combustion velocity after the ignition. As a result, an optimum torque can be generated from the engine.

The construction of the compression ignition internal combustion engine of a second example for use in compression ignition control according to the first embodiment of the present invention will be described below with reference to FIG. 6.

Figure 6:
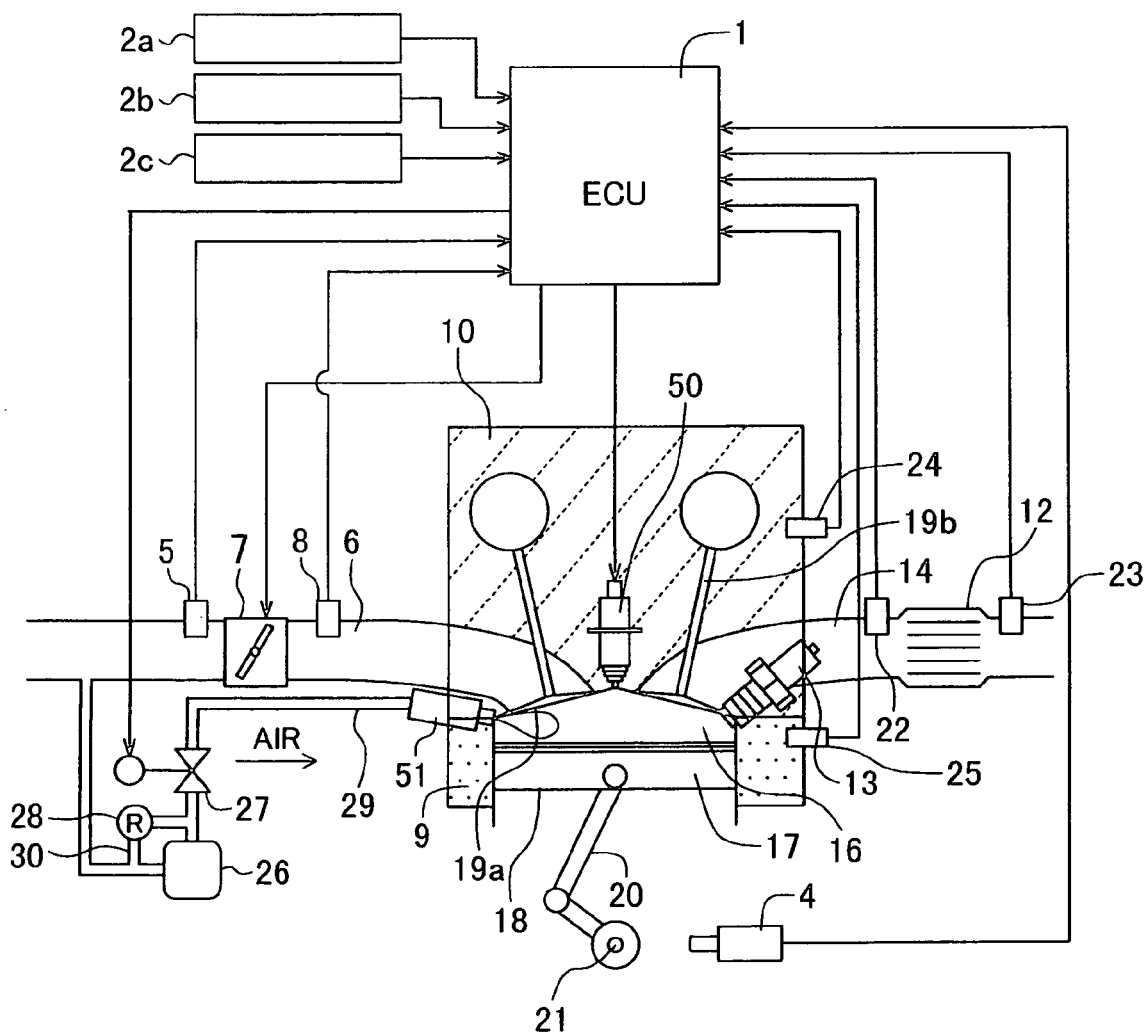
FIG. 6 is a block diagram showing the construction of the compression ignition internal combustion engine of a second example for use in compression ignition control according to the first embodiment of the present invention.

FIG. 6 is a block diagram showing the construction of the compression ignition internal combustion engine of a second example for use in compression ignition control according to the first embodiment of the present invention. It is to be noted that the same characters as those in FIG. 1 denote the same parts.

In this example, a fuel injection valve 50 for injecting fuel and an air injection valve 51 for injecting air are provided separately from each other. With such an arrangement, optimum ignition control can be performed in a similar manner to that in the embodiment shown in FIGS. 1 to 5.

The installed positions of the fuel injection valve 50 and the air injection valve 51 are not limited to only the illustrated positions, and similar advantages to those described above can also be obtained with any other suitable arrangement of those valves.

The construction of the compression ignition internal combustion engine of a third example for use in compression ignition control according to the first embodiment of the present invention will be described below with reference to FIG. 7.

Figure 7:
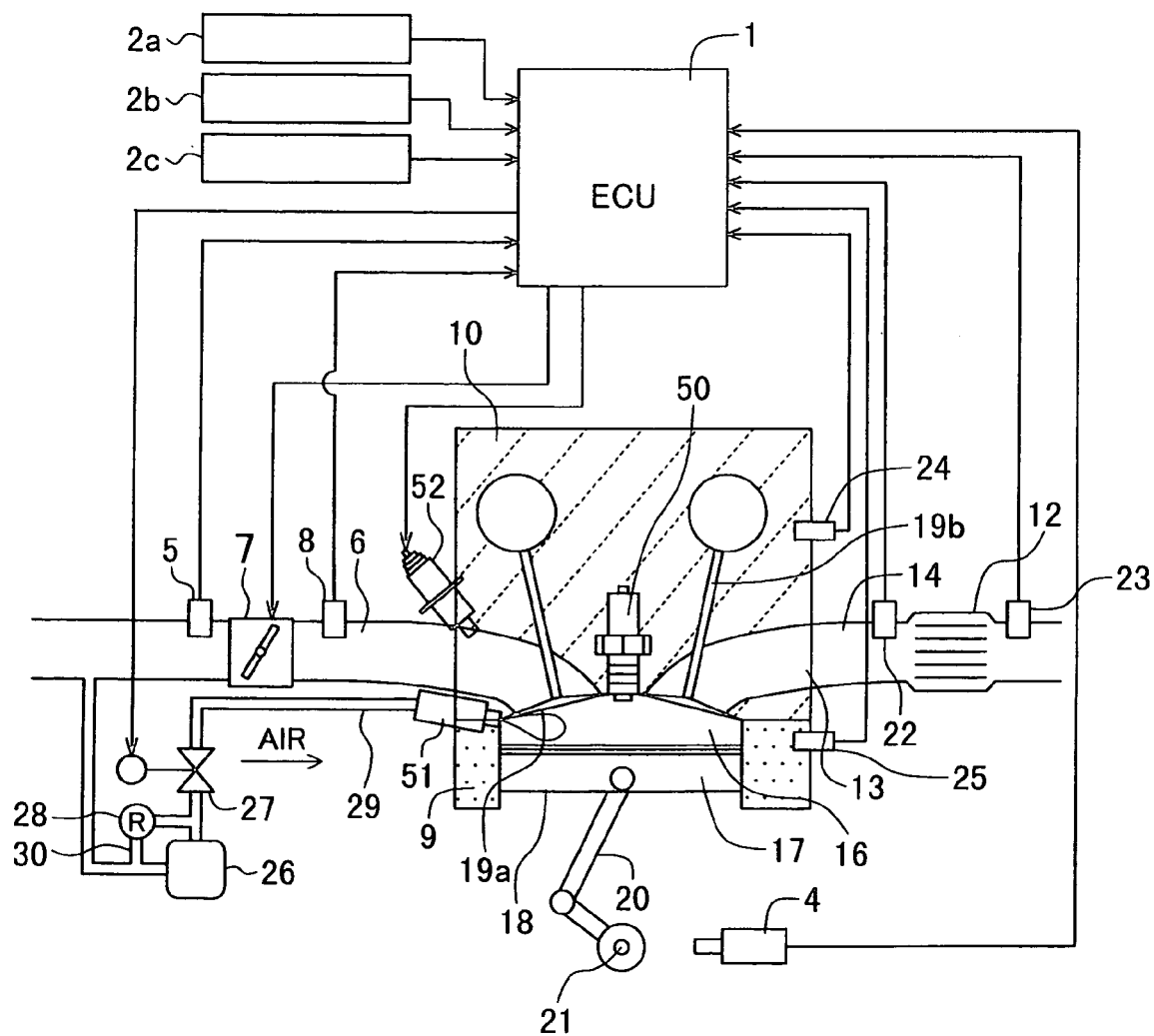
FIG. 7 is a block diagram showing the construction of the compression ignition internal combustion engine of a third example for use in compression ignition control according to the first embodiment of the present invention.

FIG. 7 is a block diagram showing the construction of the compression ignition internal combustion engine of a third example for use in compression ignition control according to the first embodiment of the present invention. It is to be noted that the same characters as those in FIG. 1 denote the same parts.

In this example, a fuel injection valve 52 for injecting fuel and an air injection valve 51 for injecting air as the ignition trigger factor are provided separately from each other. Further, the fuel injection valve 52 is disposed to be open to the intake port 6. With such an arrangement, optimum ignition control can be performed in a similar manner to that in the embodiment shown in FIGS. 1 to 5.

The installed positions of the fuel injection valve 52 and the air injection valve 51 are not limited to only the illustrated positions, and similar advantages to those described above can also be obtained with any other suitable arrangement of those valves.

The construction of the compression ignition internal combustion engine of a fourth example for use in compression ignition control according to the first embodiment of the present invention will be described below with reference to FIG. 8.

Figure 8:
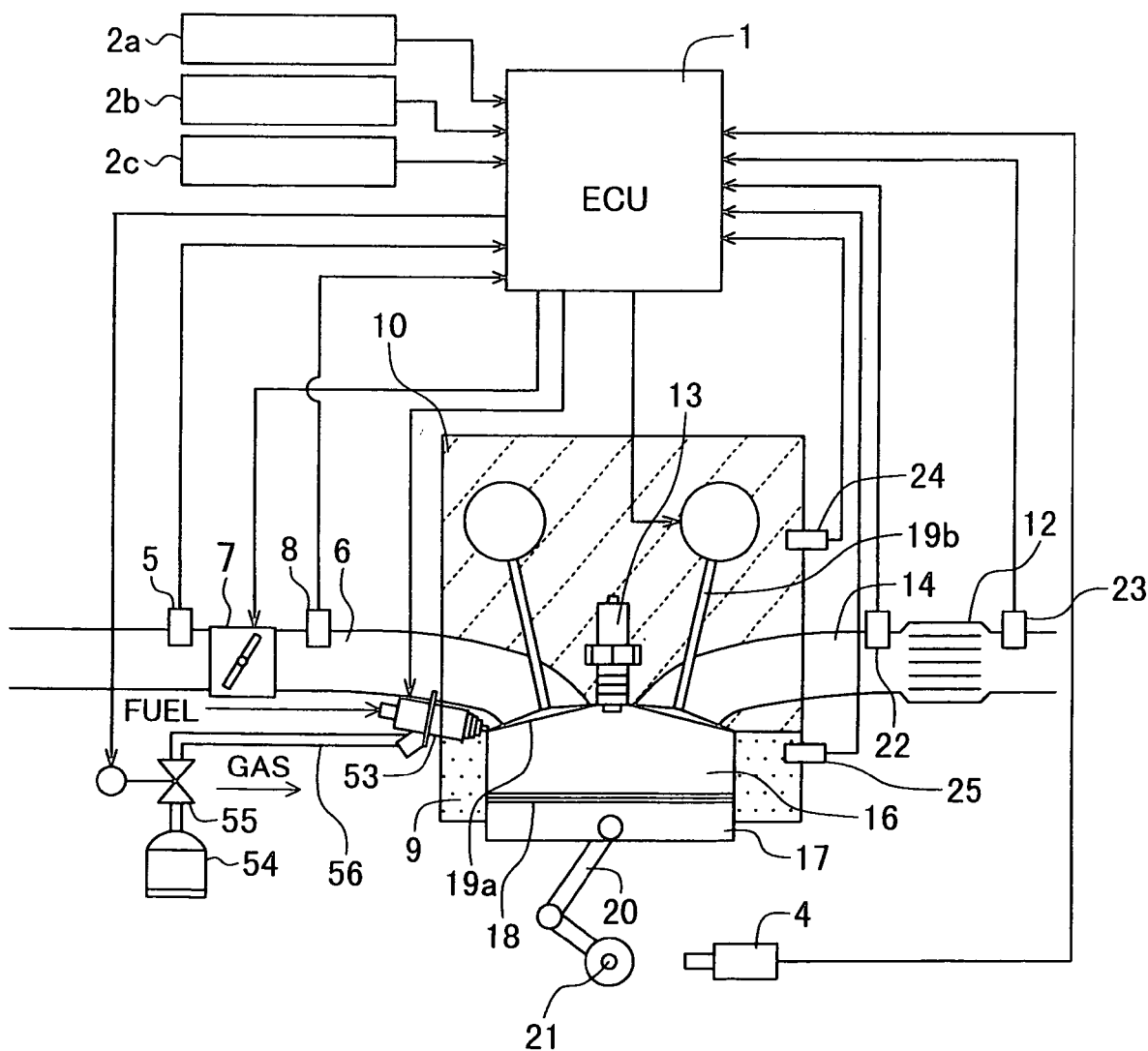
FIG. 8 is a block diagram showing the construction of the compression ignition internal combustion engine of a fourth example for use in compression ignition control according to the first embodiment of the present invention.

FIG. 8 is a block diagram showing the construction of the compression ignition internal combustion engine of a fourth example for use in compression ignition control according to the first embodiment of the present invention. It is to be noted that the same characters as those in FIG. 1 denote the same parts.

In this example, a fuel system and a gas bomb 54 for triggering ignition are both connected to a fuel injection valve 53 for injecting fuel. Because this example enables a gas, such as hydrogen, carbon dioxide or nitrogen, to be used as the ignition trigger factor instead of air, the type of gas in the gas bomb 54 mounted on the vehicle can be selectively used depending on the engine properties and the state in use. With such an arrangement, optimum ignition control can be performed in a similar manner to that in the embodiment shown in FIGS. 1 to 5.

The installed position of the fuel injection valve 53 is not limited to only the illustrated position, and similar advantages to those described above can also be obtained with the fuel injection valve disposed in any other suitable position, e.g., at a side or upper surface of the combustion chamber 16.

With this embodiment, as described above, a gas including air, for example, is injected as the ignition trigger factor into the combustion chamber at the timing to be ignited, thereby raising the pressure in the combustion chamber and causing ignition to occur. Accordingly, the optimum ignition timing can be realized over a wide range of operating conditions. Further, by performing such control for each of cylinders, it is possible to easily realize the ignition control per cylinder and per cycle.

Note that the present invention is not limited to the constructions of the above-described examples. As a matter of course, the scope of this embodiment also involves, for example, a construction in which burnt gas is accumulated in, e.g., an auxiliary chamber connected to the combustion chamber by utilizing the combustion pressure in the previous cycle, and the accumulated gas is injected in the next cycle so as to serve as an ignition trigger.

Further, combustion-chamber pressure detecting means, such as a pressure sensor for detecting the pressure in the combustion chamber, may be provided and the injection pressure of the ignition trigger factor may be controlled depending on the detected result of the pressure in the combustion chamber and the engine operating conditions.

As an alternative, this embodiment may be modified as follows. Means for detecting the operating state of ignition-trigger-factor injecting means by detecting the pressure of the pressurized air and means for detecting the operating state of the compression ignition internal combustion engine are provided. Then, control is performed so as to inhibit the engine operation with self-ignition combustion when it is determined that the engine operation with self-ignition combustion is improper or disabled, based on at least one of the detection result of the means for detecting the operating state of the ignition-trigger-factor injecting means and the detection result of the means for detecting the operating state of the compression ignition internal combustion engine.

As described above, this embodiment is featured in injecting the pressurized air or both the pressurized air and the fuel near the compression top dead center with intent to increase the temperature and pressure of the air-fuel mixture during the compressive operation of the piston, thereby triggering the ignition. Also, this embodiment is intended to increase the charging rate in the combustion chamber by the fluid injection so that the temperature and pressure in the combustion chamber are increased to reach an ignitable state. Accordingly, the injected fluid is not limited to only the pressurized air and the fuel, and a gas other than air can also be used.

The construction and the operation of a compression ignition internal combustion engine according to a second embodiment of the present invention will be described below with reference to FIGS. 9 to 19.

First, the construction of the compression ignition internal combustion engine according to this embodiment will be described with reference to FIGS. 9 and 10.

Figure 9:
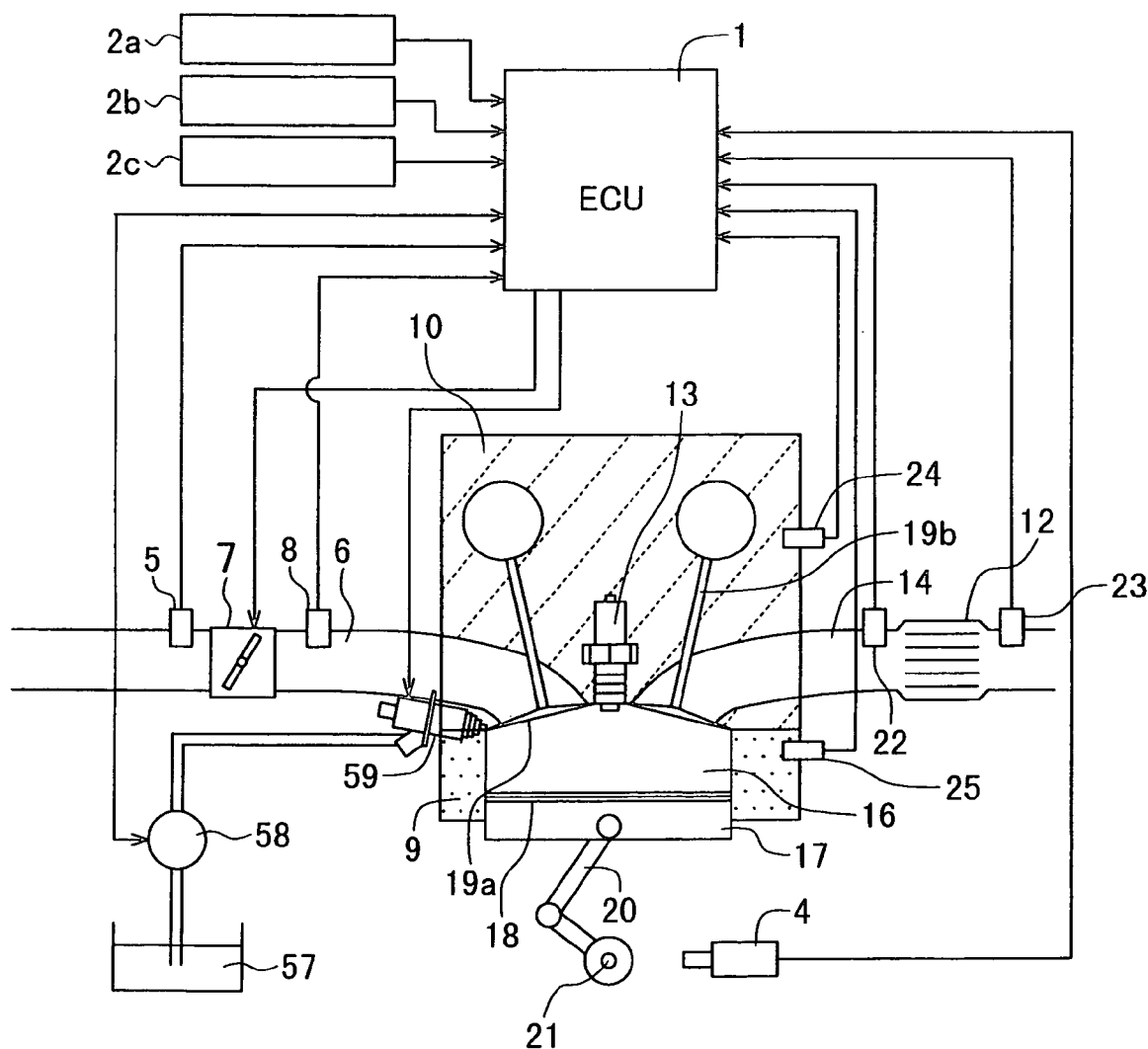
FIG. 9 is a block diagram showing the construction of a compression ignition internal combustion engine according to a second embodiment of the present invention.
Figure 10:
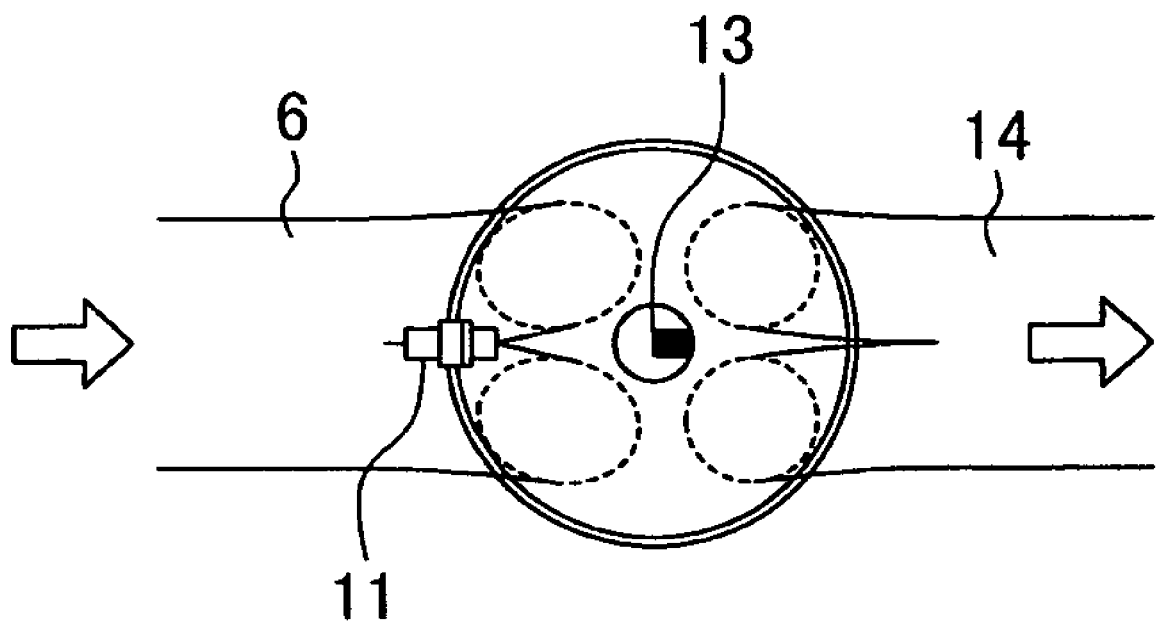
FIG. 10 is a plan view showing the construction of a combustion chamber and thereabout in the compression ignition internal combustion engine according to the second embodiment of the present invention.

FIG. 9 is a block diagram showing the construction of the compression ignition internal combustion engine according to the second embodiment of the present invention, and FIG. 10 is a plan view showing the construction of a combustion chamber and thereabout in the compression ignition internal combustion engine according to the second embodiment of the present invention. It is to be noted that the same characters as those in FIGS. 1 and 2 denote the same parts.

A fuel injection valve 59 used in this embodiment has a plurality of injection holes formed in its nozzle portion. The pressure of fuel 57 is regulated by a fuel pump 58, and the regulated fuel is injected into the combustion chamber 16 by the fuel injection valve 59. In this embodiment, the ECU 1 controls the fuel pressure by using the fuel pump 58 depending on the engine operating conditions.

Next, the construction of a fuel injection valve used in the compression ignition internal combustion engine according to this embodiment will be described with reference to FIG. 11.

Figure 11A:
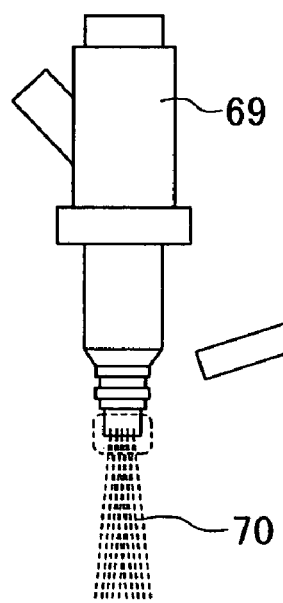
FIG. 11 is an explanatory view for explaining the construction of a fuel injection valve used in the compression ignition internal combustion engine according to the second embodiment of the present invention.
Figure 11B:
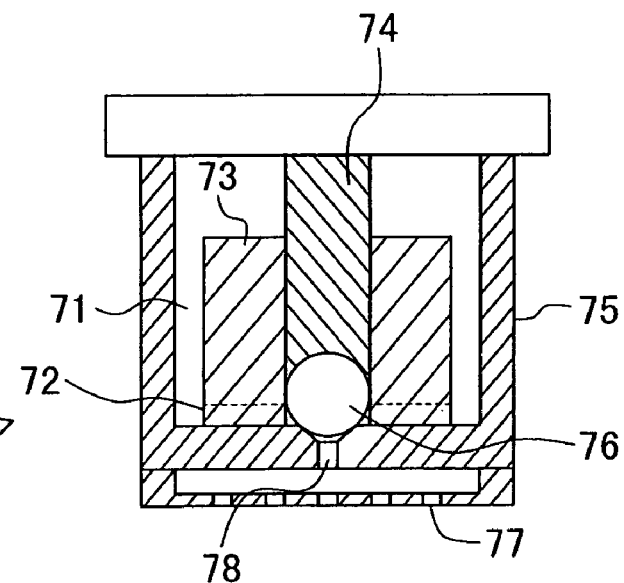
Figure 11C:
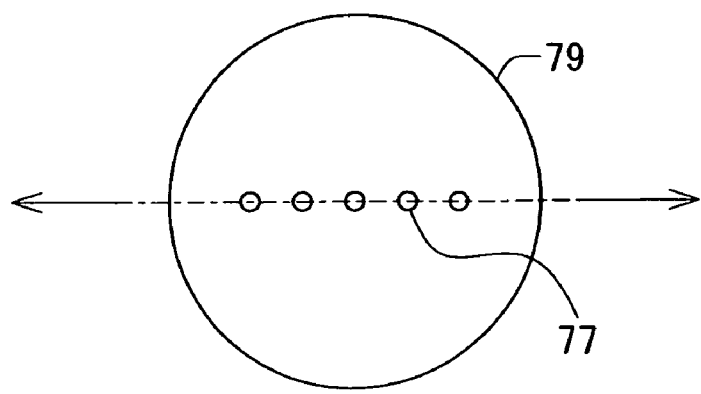

FIG. 11 is an explanatory view for explaining the construction of the fuel injection valve used in the compression ignition internal combustion engine according to the second embodiment of the present invention. FIG. 11(A) is a plan view showing the overall construction of the fuel injection valve used in this embodiment, FIG. 11(B) is a sectional view of a principal part of the fuel injection valve used in this embodiment, and FIG. 11(C) is a bottom view of the fuel injection valve used in this embodiment.

As shown in FIG. 11(A), a plurality of fuel sprays are injected from a fore end portion of the fuel injection valve 69.

As shown in FIG. 11(B), a nozzle 75 is attached to the fore end portion of the fuel injection valve. A main jet hole 78 is formed at a fore end of the nozzle 75. A plunger 74 and a swirler 73 are disposed inside the nozzle 75. A ball 76 is attached to a fore end of the plunger 74. A fuel passage 71 and a swirler flow passage 72 are formed between the swirler 73 and the nozzle 75. Upon the nozzle 75 moving up and down, the ball 76 opens and closes the main jet hole 78, whereby the fuel supplied via the fuel passage 71 and the swirler flow passage 72 is jetted through the main jet hole 78. An atomizer 79 is provided at the fore end of the nozzle 75.

As shown in FIG. 11(C), the atomizer 79 has a plurality of sub-jet holes 77 formed therein. The fuel jetted through the main jet hole 78 is injected into the combustion chamber 16 through the plurality of sub-jet holes 77. Additionally, the ball 76 may be replaced with another member having a conical or other suitable shape.

While five jet holes are arranged to lie on a straight line in the illustrated example, the arrangement and the number of the jet holes are both not limited to the illustrated ones. The atomizer may modified in various ways so long as a plurality of jet holes are formed and arranged such that fuel sprays jetted through the respective jet holes interfere with each other. As a matter of course, all those modifications are also involved in the scope of this embodiment.

A method for controlling the compression ignition internal combustion engine according to this embodiment will be described below with reference to FIGS. 12 to 14.

Figure 12:
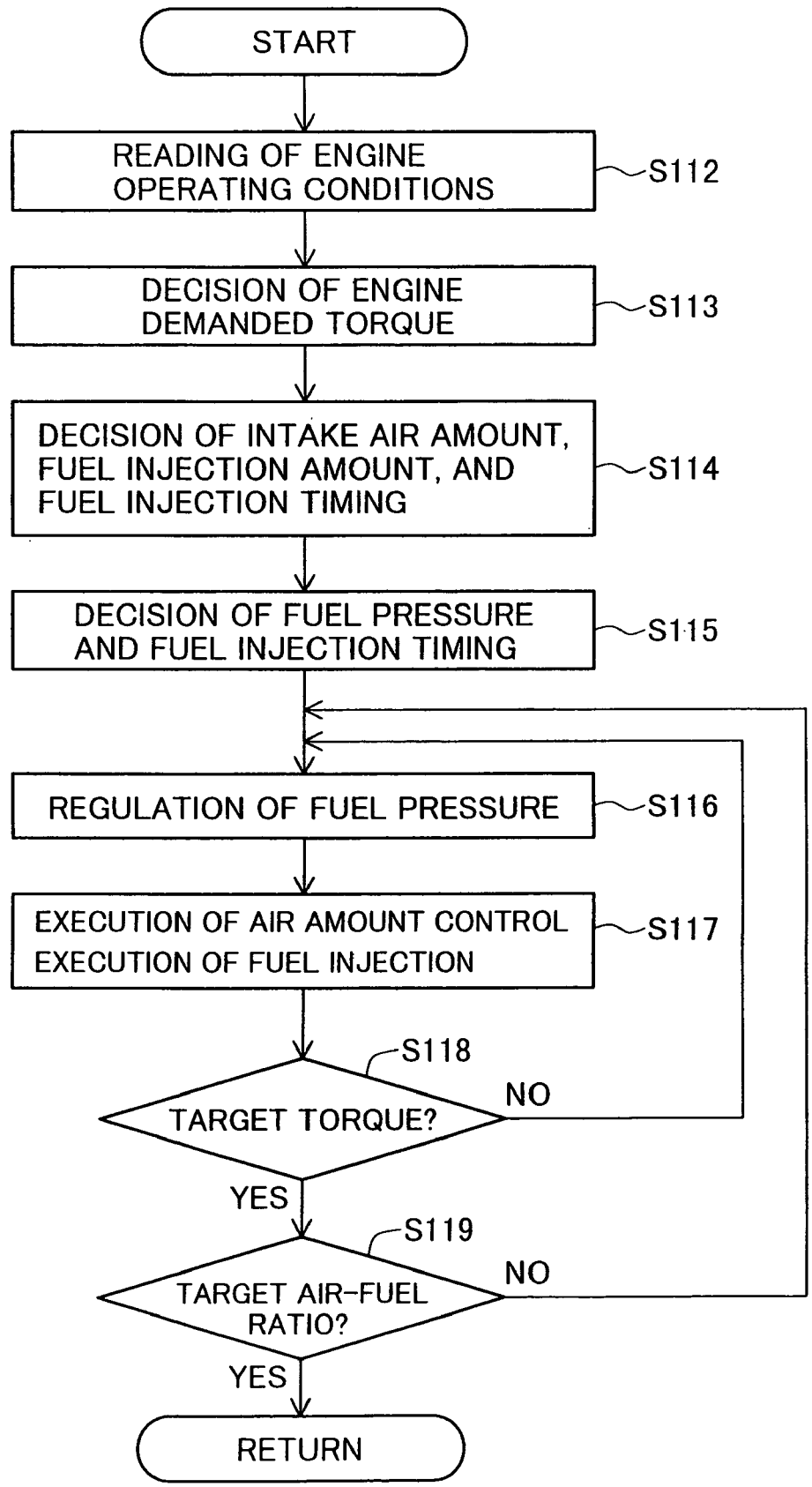
FIG. 12 is a flowchart showing an ignition control method for the compression ignition internal combustion engine according to the second embodiment of the present invention.
Figure 13:
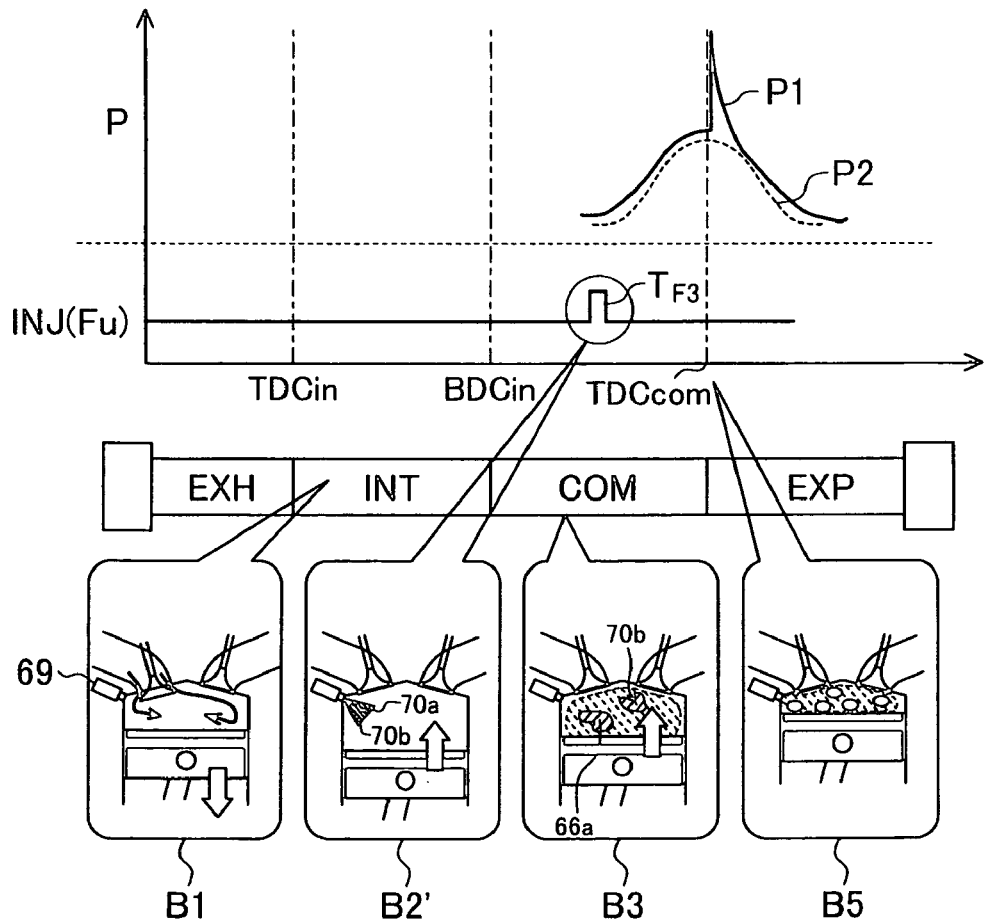
FIG. 13 is an explanatory view for explaining the operation of the compression ignition internal combustion engine according to the second embodiment of the present invention.
Figure 14:
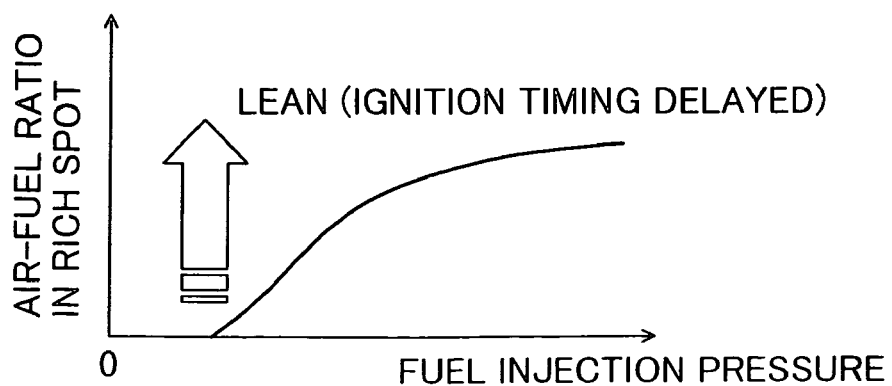
FIG. 14 is a graph for explaining the relationship between a fuel pressure and an air-fuel ratio in a rich spot after the lapse of a predetermined time under a constant atmospheric pressure in the compression ignition internal combustion engine according to the second embodiment of the present invention.

FIG. 12 is a flowchart showing an ignition control method for the compression ignition internal combustion engine according to the second embodiment of the present invention, FIG. 13 is an explanatory view for explaining the operation of the compression ignition internal combustion engine according to the second embodiment of the present invention, and FIG. 14 is a graph for explaining the relationship between a fuel pressure and an air-fuel ratio in a rich spot after the lapse of a predetermined time under a constant atmospheric pressure in the compression ignition internal combustion engine according to the second embodiment of the present invention.

First, the ECU 1 reads the engine operating conditions in step S112.

Then, the ECU 1 decides the engine target torque in step S113.

Then, in step S114, the ECU 1 decides the intake air amount, the fuel injection amount and the fuel injection timing based on the result obtained in step S113.

Further, in step S115, the ECU 1 decides the fuel pressure and the fuel injection period based on the result obtained in step S113.

Then, in step S116, the ECU 1 controls the fuel pump 58 so that the pressure of fuel supplied from the fuel pump 58 is regulated to a predetermined fuel pressure.

Then, in step S117, the ECU 1 executes air amount control and fuel injection.

With reference to FIG. 13, a description is now briefly made of control executed in the compression ignition internal combustion engine according to this embodiment. It is to be noted that the same characters as those in FIG. 4 denote the same parts.

As indicated by a balloon B2', sprays 70a injected through respective jet holes of the fuel injection valve 69 shown in FIG. 11 interfere with each other in the combustion chamber, thereby forming an area 70b in which the fuel concentration is high (hereinafter referred to as a "rich spot"). In the rich spot 70b, the sprays 70a collide (interfere) with each other to produce particles having larger sizes, and therefore fuel diffusion is retarded in comparison with the other area in the sprays 70a. In the other area than the rich spot 70b, however, fuel evaporation is progressed to form a lean air-fuel mixture 66a over a relatively large region in the combustion chamber 16 as indicated by a balloon B3.

At the timing at which the top dead center is reached with the progress of the compressive operation of the piston, as indicated by a balloon B5, the air-fuel mixture is ignited near an area in which the air-fuel ratio is relatively large, i.e., near the rich spot 70b. The ignition in the rich spot 70b increases abruptly the temperature and pressure in the combustion chamber 16, thus bringing about ignition in the lean area 66a as well. In this respect, because a time lag between the ignition timing near the rich spot 70b and the ignition timing in the lean region 66a is very small, the ignitions can be regarded as occurring substantially at the same time.

In other words, this embodiment is featured in using, as an ignition trigger, the rich spot 70b produced by the spray interference. While the air-fuel ratio in the rich spot 70b can be controlled by changing the particle size with regulation of the fuel pressure, it is desired that, at the ignition timing, the air-fuel ratio near the rich spot 70b be almost equal to or richer than the stoichiometric air-fuel ratio.

With reference to FIG. 14, a description is now made of the relationship between the fuel pressure and the air-fuel ratio in the rich spot after the lapse of a predetermined time under a constant atmospheric pressure.

As seen from FIG. 14, when the fuel pressure rises, the air-fuel ratio in the rich spot is increased, i.e., the air-fuel mixture becomes leaner, whereby the compression ignition timing is delayed correspondingly. Stated another way, by controlling the fuel pressure depending on the engine operating conditions, it is possible to control the air-fuel ratio and the fuel diffusion velocity in the sprays and hence to control the compression ignition timing.

Then, in step S118 of FIG. 12, the ECU 1 determines whether the torque generated at that time reaches the target torque.

If the target torque is not reached, the ECU 1 returns to steps S116 and S117 in which the fuel pressure under the regulation by the fuel pump 58, the air amount and the fuel injection are subjected to feedback control.

Then, if the target torque is reached, the ECU 1 determines in step S119 whether the target air-fuel ratio is obtained.

If the target air-fuel ratio is not obtained, the ECU 1 returns to steps S116 and S117 in which the fuel pressure under the regulation by the fuel pump 58, the air amount and the fuel injection are subjected to feedback control.

If the target air-fuel ratio is obtained, the control process is brought to an end.

Thus, since the ignition timing is controlled so as to obtain the demanded torque from the ECU 1 with the fuel pressure control, the smooth engine operating state can be achieved or maintained. Further, by properly controlling the total air-fuel ratio depending on the catalyst state, it is also possible to realize the less-exhaust operation.

A second control method for the compression ignition internal combustion engine according to this embodiment will be described with reference to FIG. 15.

Figure 15:
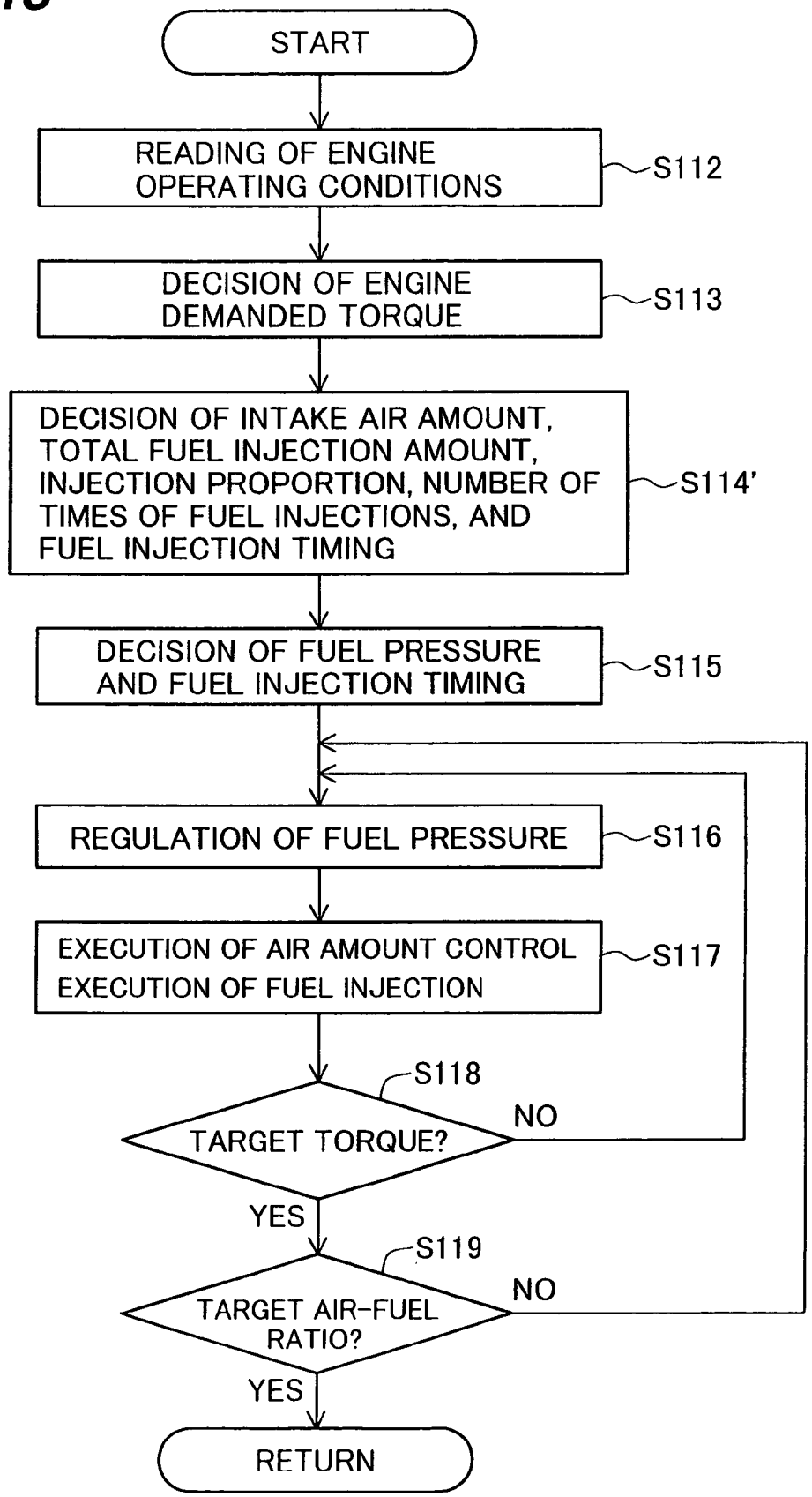
FIG. 15 is a flowchart showing a second ignition control method for the compression ignition internal combustion engine according to the second embodiment of the present invention.

FIG. 15 is a flowchart showing a second ignition control method for the compression ignition internal combustion engine according to the second embodiment of the present invention. It is to be noted that the same step numbers as those in FIG. 12 denote the same processing procedures.

In this example, fuel is injected plural times per one cycle. More specifically, in step S114', the ECU 1 decides the injection proportion, the number of times of injections, the injection timing, etc. When injecting the fuel plural times at different points in time during one cycle, e.g., twice in the compression stroke, the previously injected fuel is diffused for a longer diffusion time until reaching the ignition than the fuel injected at a later point in time in the compression stroke, and hence the former fuel is more apt to form a relatively homogeneous air-fuel mixture in a wide region of the combustion chamber (the air-fuel ratio in that wide region is set, though depending on the fuel injection amount, to be lean in most cases). In other words, the fuel injection in plural times enables a rich region and a lean region to be more definitely separated from each other.

Other constructions of the fuel injection valve used in the compression ignition internal combustion engine according to this embodiment will be described below with reference to FIGS. 16 to 19.

Figure 16A:
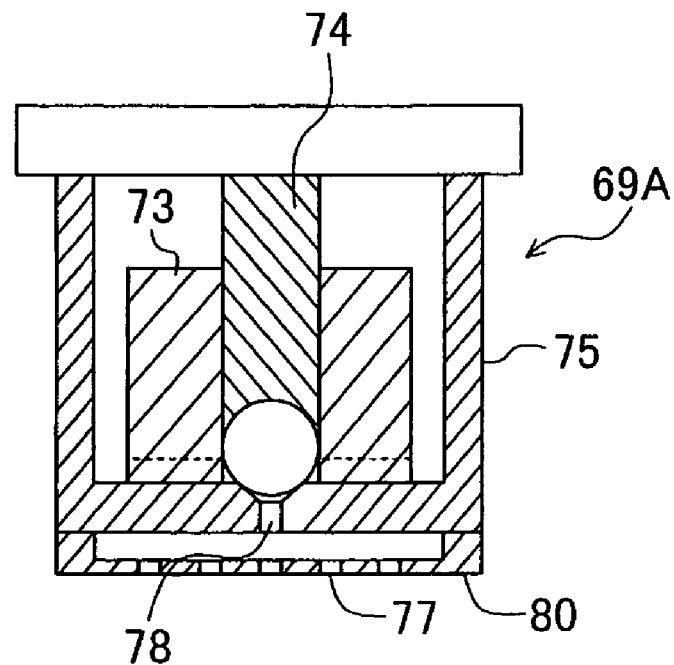
FIG. 16 is an explanatory view for explaining a second construction of the fuel injection valve used in the compression ignition internal combustion engine according to the second embodiment of the present invention.
Figure 16B:
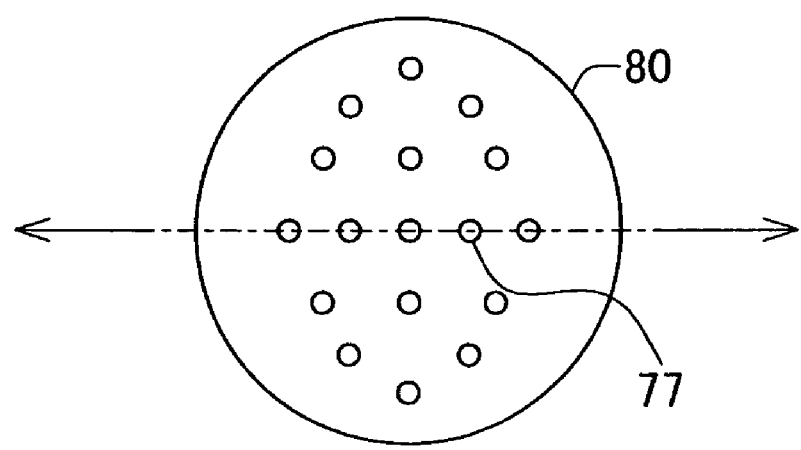

FIG. 16 is an explanatory view for explaining a second construction of the fuel injection valve used in the compression ignition internal combustion engine according to the second embodiment of the present invention. FIG. 16(A) is a sectional view of a principal part of the fuel injection valve used in this embodiment, and FIG. 16(B) is a bottom view of the fuel injection valve used in this embodiment.

A fuel injection valve 69A has a number of jet holes 77 formed in a nozzle surface 80A. With this arrangement, fuel is diffused over a wider area in the combustion chamber 16.

When the rich and lean regions are produced upon the interference of respective sprays, an excessively rich spot can be avoided from being generated at the ignition timing. As a result, the generation of soot and NOx can be suppressed.

Figure 17A:
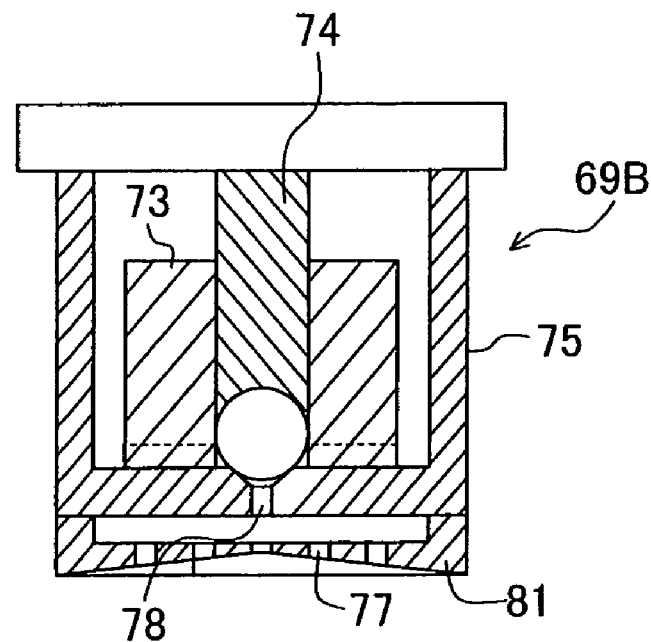
FIG. 17 is an explanatory view for explaining a third construction of the fuel injection valve used in the compression ignition internal combustion engine according to the second embodiment of the present invention.
Figure 17B:
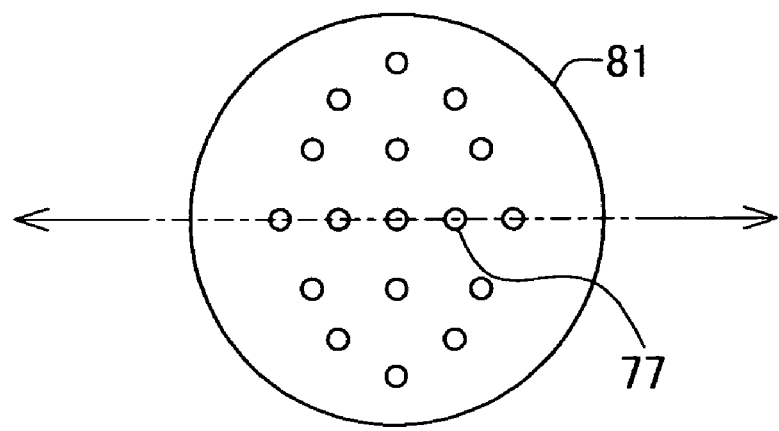

FIG. 17 is an explanatory view for explaining a third construction of the fuel injection valve used in the compression ignition internal combustion engine according to the second embodiment of the present invention. FIG. 17(A) is a sectional view of a principal part of the fuel injection valve used in this embodiment, and FIG. 17(B) is a bottom view of the fuel injection valve used in this embodiment.

In a fuel injection valve 69B, a nozzle top surface 81 has a plurality of jet holes 77 formed therein and is sloped toward the center. Injected fuel is directed toward a certain space in the combustion chamber 16. Such a pattern of the jet holes causes not only sprays jetted through adjacent jet holes to interfere with each other, but also a part or all of the jetted sprays to collide (interfere) with each other at a certain point in the combustion chamber.

Figure 18A:
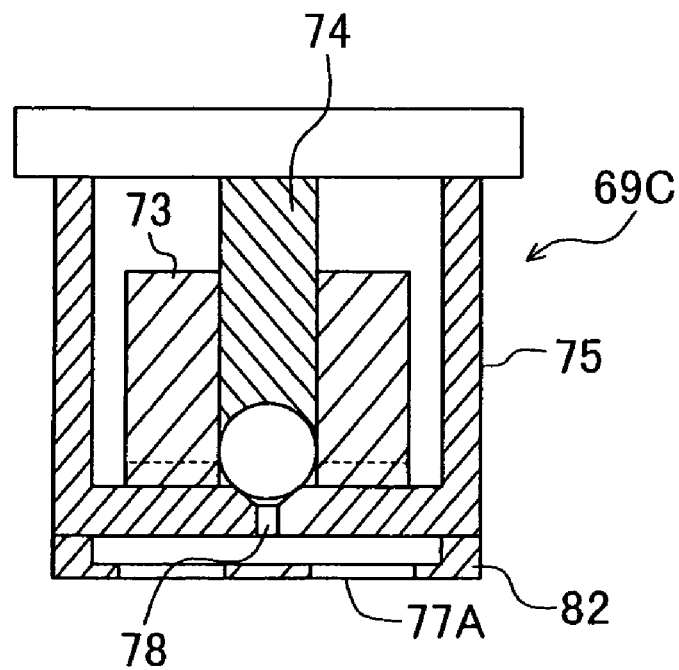
FIG. 18 is an explanatory view for explaining a fourth construction of the fuel injection valve used in the compression ignition internal combustion engine according to the second embodiment of the present invention.
Figure 18B:
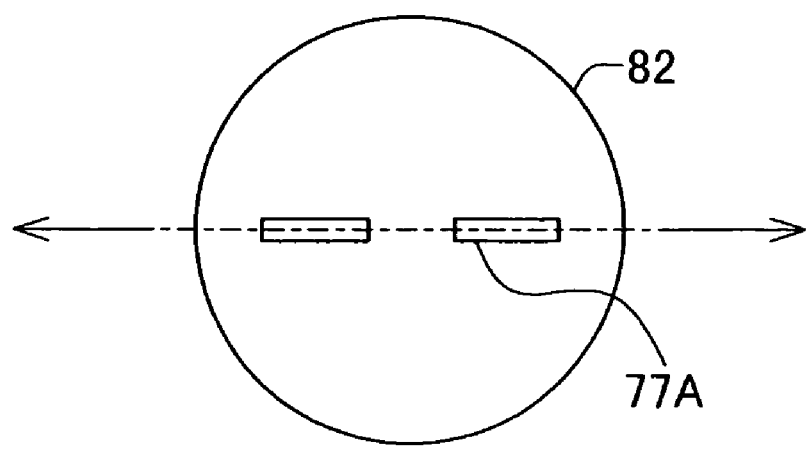

FIG. 18 is an explanatory view for explaining a fourth construction of the fuel injection valve used in the compression ignition internal combustion engine according to the second embodiment of the present invention. FIG. 18(A) is a sectional view of a principal part of the fuel injection valve used in this embodiment, and FIG. 18(B) is a bottom view of the fuel injection valve used in this embodiment.

A fuel injection valve 69C has a plurality of slit-shaped jet holes 77A. With such a pattern of the jet holes, sprays are jetted through the respective jet holes in a sector shape about each of the jet holes, and the jetted sprays interfere with each other in a space inside the combustion chamber.

Figure 19A:
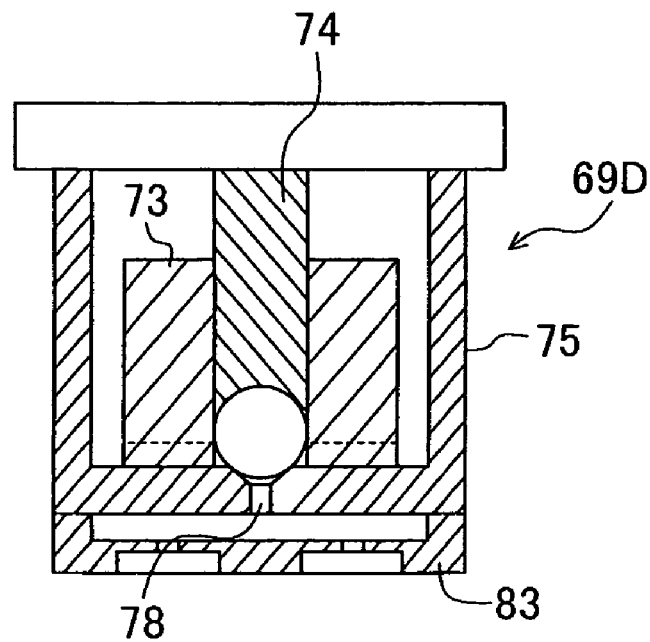
FIG. 19 is an explanatory view for explaining a fifth construction of the fuel injection valve used in the compression ignition internal combustion engine according to the second embodiment of the present invention.
Figure 19B:
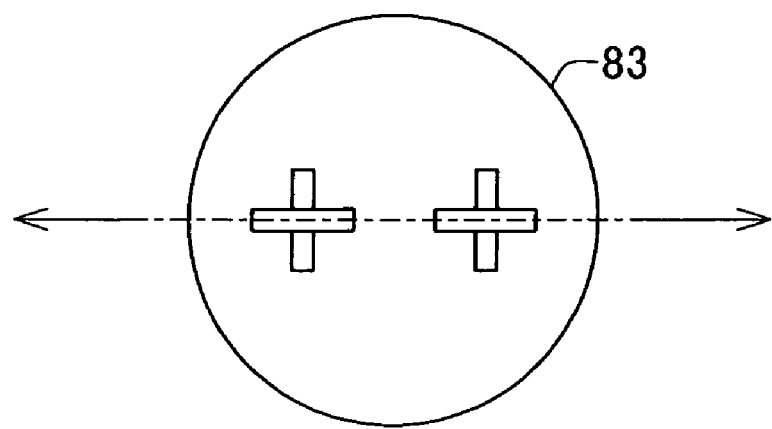

FIG. 19 is an explanatory view for explaining a fifth construction of the fuel injection valve used in the compression ignition internal combustion engine according to the second embodiment of the present invention. FIG. 19(A) is a sectional view of a principal part of the fuel injection valve used in this embodiment, and FIG. 19(B) is a bottom view of the fuel injection valve used in this embodiment.

A fuel injection valve 69D has a pattern of jet holes obtained by forming slit-shaped nozzles in a nozzle plate 83, which has a pattern of jet holes formed therein as shown in FIG. 18, such that the former jet holes overlap with the latter jet holes in a crossed relation. Because this jet hole arrangement has the function of amplifying turbulence upstream of the jet holes, a greater atomization effect than that in the example of FIG. 18 can be obtained.

It is needless to say that the scope of this embodiment involves not only the constructions and jet hole patterns of the fuel injection valves shown in FIGS. 16 to 19, but also any other suitable fuel injection valves having a plurality of jet holes and developing the same effect as that obtainable with this embodiment.

With this embodiment, as described above, the fuel injection valve used in the compression ignition internal combustion engine has a plurality of jet holes formed in its nozzle portion so that injected fuel sprays interfere with each other in the combustion chamber. Fuel droplets are harder to diffuse in an area where the sprays interfere with each other. By controlling the fuel pressure of the injected fuel depending on the engine operating conditions, therefore, it is possible to control a air-fuel ratio distribution in a entire spray region and the fuel diffusion velocity, and hence to properly control the compression ignition timing by using those parameters as an ignition trigger.

The construction and the operation of a compression ignition internal combustion engine according to a third embodiment of the present invention will be described below with reference to FIGS. 20 to 22.

First, the construction of the compression ignition internal combustion engine according to this embodiment will be described below with reference to FIG. 20.

Figure 20:
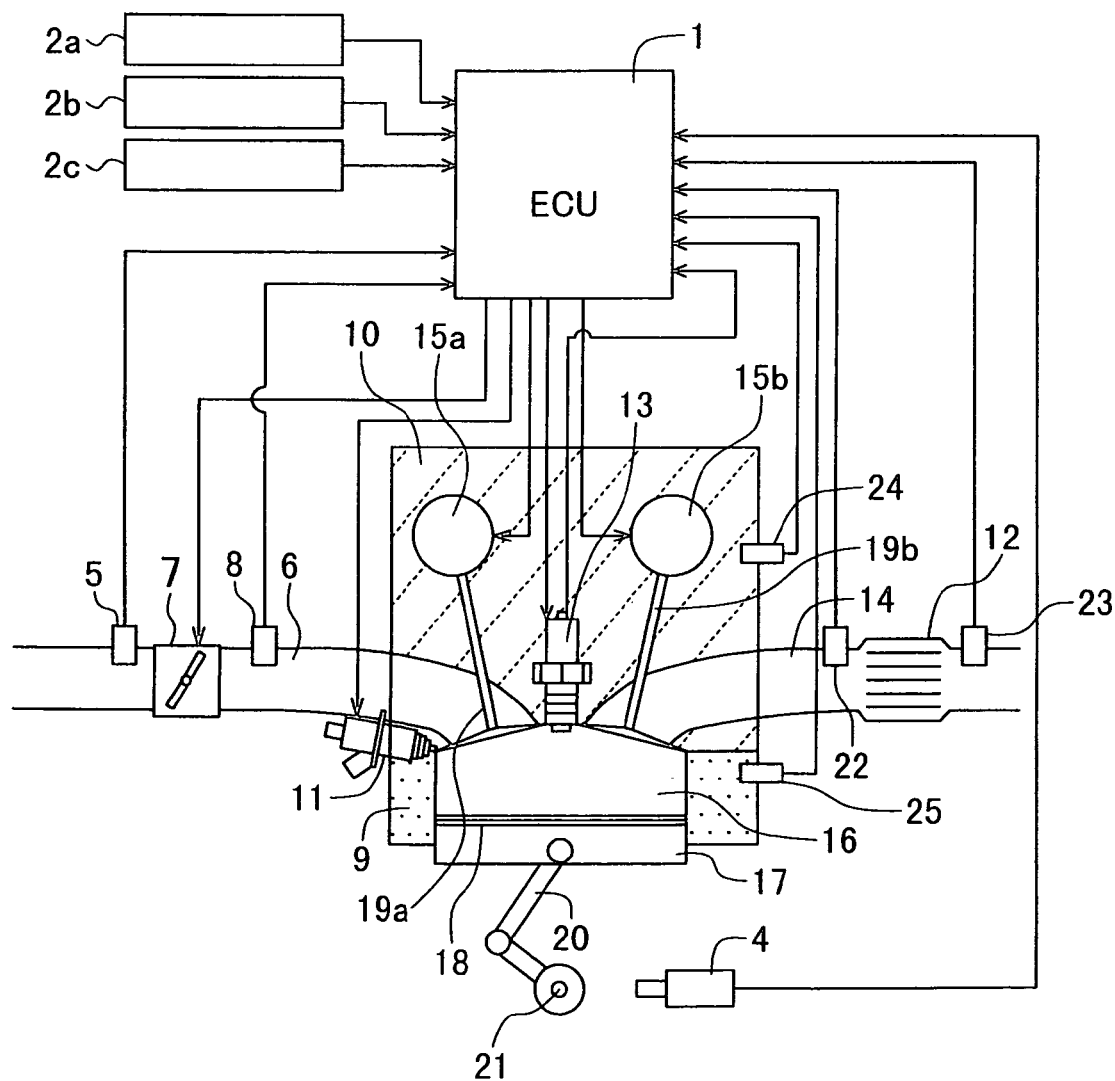
FIG. 20 is a block diagram showing the construction of a compression ignition internal combustion engine according to a third embodiment of the present invention.

FIG. 20 is a block diagram showing the construction of the compression ignition internal combustion engine according to the third embodiment of the present invention. It is to be noted that the same characters as those in FIG. 1 denote the same parts.

As shown in FIG. 20, an intake port 6 and an exhaust port 14 are communicated with a combustion chamber 16 that is surrounded by a cylinder block 9, a piston 17 and a cylinder head 10. An intake valve 19a is disposed in a joint portion between the combustion chamber 16 and the intake port 6 to open and close a passage communicating with the combustion chamber 16. An exhaust valve 19b is disposed in a joint portion between the combustion chamber 16 and the exhaust port 14 to open and close a passage communicating with the combustion chamber 16. As shown in FIG. 2, the intake port 6 is connected to the combustion chamber 16 after being branched into two passages, and the intake valve 19a is disposed in a joint portion of each branched passage with the combustion chamber 16. Likewise, the exhaust port 14 is connected to the combustion chamber 16 after being branched into two passages, and the exhaust valve 19b is disposed in a joint portion of each branched passage with the combustion chamber 16. A reciprocating motion of the piston 17 is transmitted to a crankshaft 21 through a connecting rod 20 for thereby rotating the crankshaft 21.

An ignition plug 13 is disposed to face the combustion chamber 16, and a spark is discharged from the ignition plug 13 when spark ignition combustion is instructed from an engine control unit (ECU) 1. Also, when compression ignition combustion is instructed from the ECU 1, the ignition plug 13 is able to function as an ion current detector for detecting a combustion state. In such a case, the ignition plug 13 monitors the combustion state and the ignition timing in the combustion chamber 16. However, when the combustion is performed by compression ignition all over the operating range, i.e., by only the compressive operation of the piston, without employing the ignition plug 13, it is no longer required to install the ignition plug 13. While the ignition plug 13 is disposed in a central top portion of the combustion chamber 16 in the drawing, the installed position of the ignition plug 13 is not particularly limited to the illuminated one.

The ECU 1 takes in successively output values of an accelerator opening detector 2a and a brake depressing force detector 2b both serving as driver's intention detecting means for detecting the intention of a driver driving a vehicle in which the compression ignition internal combustion engine of this embodiment is equipped, an output value of a vehicle speed detector 2c serving as vehicle traveling-state detecting means for detecting a vehicle traveling state, as well as respective output values of an airflow sensor 5, an engine cooling-water temperature sensor 24, an air-fuel ratio sensor 22, a behind-catalyst exhaust temperature sensor 23 mounted behind a catalyst 12, a crank angle sensor 4, and a knock sensor 25, which serve to detect the engine operating conditions. In this connection, the airflow sensor 5 preferably has the additional function of measuring an intake air temperature, and a resulting output value is also taken into the ECU 1 at the same time.

In this embodiment, an engine target torque is calculated from the output value of the accelerator opening detector 2a. As means for obtaining an acceleration of the vehicle in which the compression ignition internal combustion engine is equipped, this embodiment employs a differential value of a signal from the vehicle speed sensor mounted on the vehicle. As an alternative, it is also possible to install an acceleration sensor on the vehicle and to employ an output value of the acceleration sensor. Further, while this embodiment employs, as the output value of the brake depressing force detector 2b, an ON/OFF signal for determining whether the driver has depressed a brake pedal, a brake depressing force sensor may be disposed behind the brake pedal and its output value may be used. Alternatively, a braking force imposed from the driver may be measured by installing an oil pressure sensor in a hydraulic pipe for the brake.

A fuel injection valve 11 is installed to be able to directly inject fuel into the combustion chamber 16. The fuel injection valve 11 is disposed between the branched intake ports 6. While the fuel injection valve 11 is illustrated to position near an inner surface of the combustion chamber 16 in the vicinity of the intake valve 19a, the installed position is not limited to such a particular one, and the fuel injection valve 11 may be installed in any other such a position as enabling fuel to be injected into the combustion chamber 16.

Further, in this embodiment, the intake valve 19a and the exhaust valve 19b are provided respectively with variable valve mechanisms 15a, 15b. The ECU 1 controls the variable valve mechanisms 15a, 15b depending on the engine operating state, the driver's intention, the vehicle traveling state, etc., thereby controlling at least one of the valve timing and the valve lift amount of the intake valve 19a or the exhaust valve 19b.

A method for controlling the compression ignition internal combustion engine according to this embodiment will next be described with reference to FIGS. 21 and 22.

Figure 21:
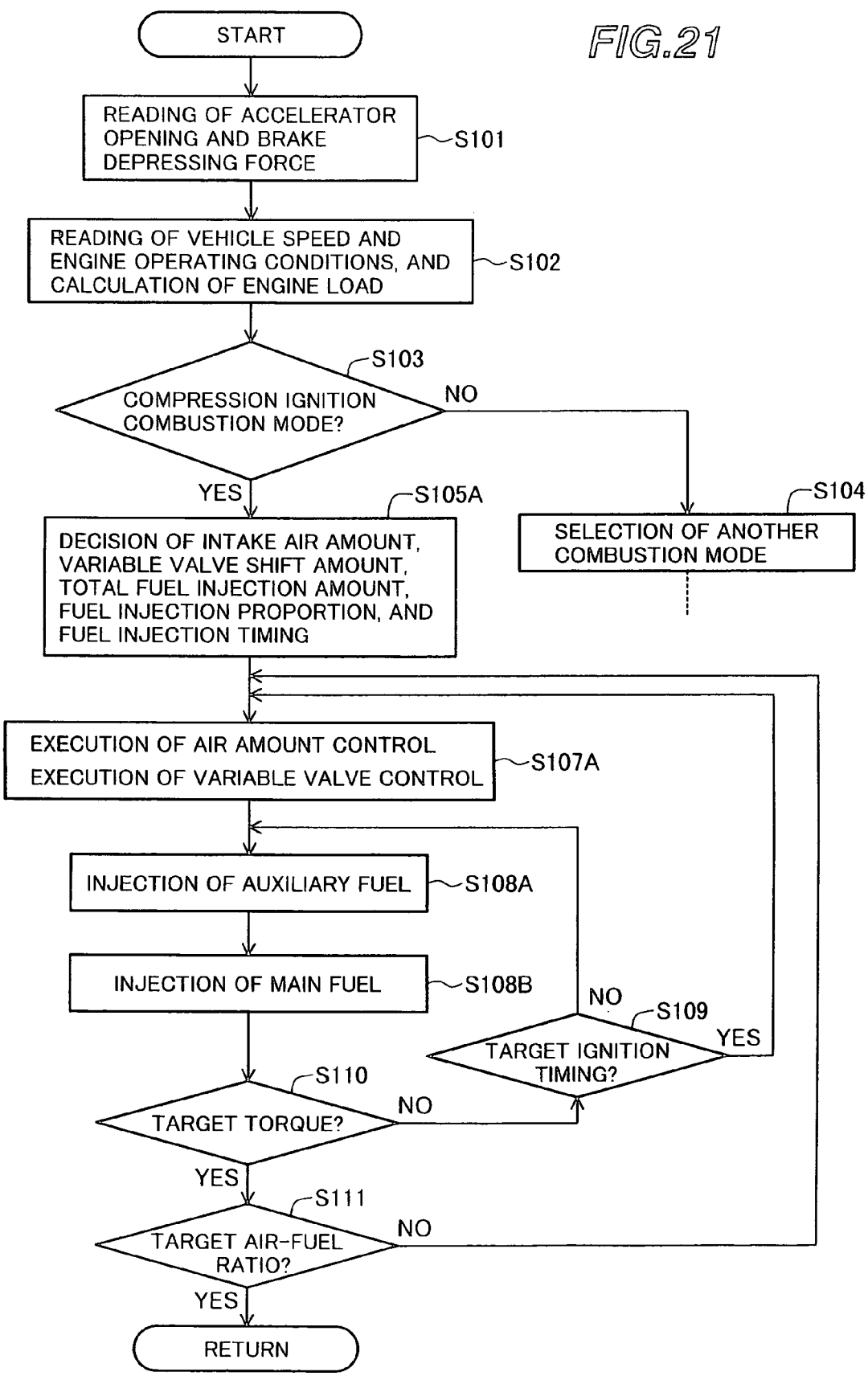
FIG. 21 is a flowchart showing an ignition control method for the compression ignition internal combustion engine according to a third embodiment of the present invention.
Figure 22:
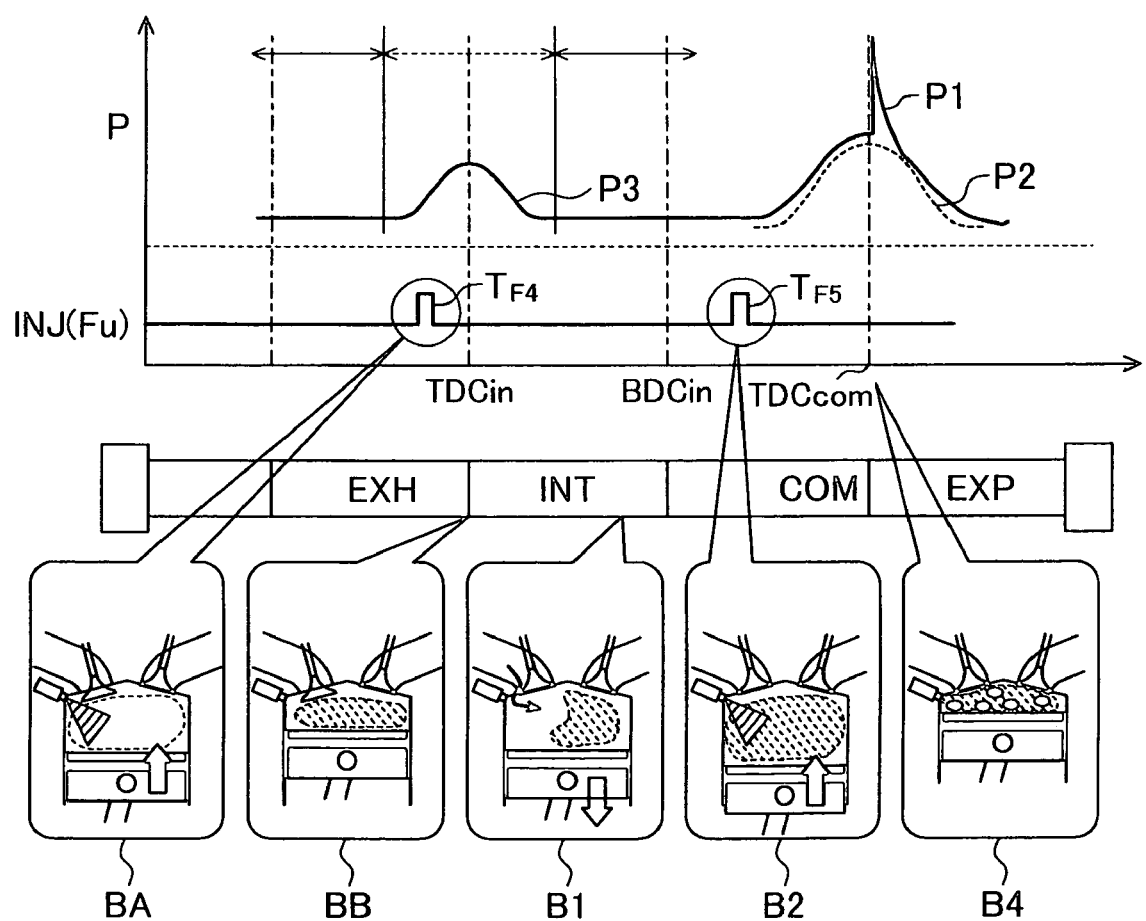
FIG. 22 is an explanatory view for explaining the operation of the compression ignition internal combustion engine according to the third embodiment of the present invention.

FIG. 21 is a flowchart showing an ignition control method for the compression ignition internal combustion engine according to the third embodiment of the present invention, and FIG. 22 is an explanatory view for explaining the operation of the compression ignition internal combustion engine according to the third embodiment of the present invention.

During the engine operation, the ECU 1 first reads in step S101 an accelerator opening from the output value of the accelerator opening detector 2a and a brake depressing force from the output value of the brake depressing force detector 2b, thereby reading the intention of the driver driving the vehicle in which the compression ignition internal combustion engine is equipped.

Then, in step S102, the ECU 1 reads the output value of the vehicle speed detector 2c to detect the vehicle traveling condition. Also, the ECU 1 reads the respective output values of the airflow sensor 5, the engine cooling-water temperature sensor 24, the air-fuel ratio sensor 22, the behind-catalyst exhaust temperature sensor 23 mounted behind the catalyst 12, the crank angle sensor 4, the knock sensor 25, etc. to detect the engine operating conditions. Based on the vehicle traveling condition and the engine operating conditions thus detected, the ECU 1 calculates an engine load.

Then, in step S103, the ECU 1 determines, based on the driver's intention read in step S101 and the engine load calculated in step S102, whether the operation caused by the compression ignition is enabled.

If it is determined in step S103 that the operation caused by the compression ignition is disabled, the ECU 1 proceeds to step S104 in which various engine parameters are controlled so as to perform, for example, spark ignition combustion when the engine is a spark ignition engine, or spray combustion when the engine is a diesel engine having no ignition plug.

On the other hand, if it is determined in step S103 that the operation caused by the compression ignition is enabled, the engine is controlled in the compression ignition combustion mode through steps subsequent to step S105.

If the engine operation in the compression ignition combustion mode is selected, the ECU 1 reads and decides, in step S105A, the intake air amount, the variable valve shift amount, the total fuel injection amount, the fuel injection proportion, and the fuel injection timing depending on the current engine operating conditions in accordance with a map stored in the ECU 1 beforehand.

A description is now made of the ignition trigger factor used in this embodiment with reference to FIG. 22. In FIG. 22, the horizontal axis represents successive strokes of the internal combustion engine, i.e., an exhaust stroke EXH, an intake stroke INT, a compression stroke COM, and an expansion stroke EXP, while the vertical axis represents a combustion chamber pressure P and fuel injection timing INJ(Fu) in respective zones.

In this embodiment, as seen from FIG. 22, in the operating mode of compression ignition combustion, the exhaust valve 19b is closed at earlier timing during the exhaust stroke, causing burnt gas produced in the preceding cycle to remain in the combustion chamber, and auxiliary fuel is injected as an ignition trigger into the remaining gas.

First, as indicated by a balloon BA, auxiliary fuel 89b is injected into a remaining gas 89a at an arbitrary timing during the exhaust stroke. An amount of the auxiliary fuel injected at that time is suppressed to be at maximum not more than 50% of the fuel amount injected per one cycle.

The injected auxiliary fuel 89b resides in the remaining gas at a high temperature and is compressed by the piston with the intake and exhaust valves being both in closed state, as indicated by a balloon BB, whereby the auxiliary fuel is modified into components containing a large amount of active chemical species, such as OH radicals. At this time, self-ignition does not occur because the amount of the auxiliary fuel is set to be at maximum not more than 50% of the total injection amount.

Subsequently, as indicated by a balloon B1, fresh air is supplied as intake air. Then, as indicated by a balloon B2 (compression stroke), remaining fuel 92a is injected as main fuel. Although the injection timing of the main fuel is not specified to a particular timing in this embodiment, it is changed depending on the engine operating conditions and the set air-fuel ratio.

The injected main fuel 92a is distributed in the combustion chamber 16, and ignition is promoted by the active chemical species, such as OH radicals, which have been produced upon the modification of the auxiliary fuel 89b. Then, as indicated by a balloon B4, self-ignition occurs near the compression top dead center. At this time, as a matter of course, the modified auxiliary fuel 89b is also ignited and contributes to generating heat in the combustion chamber 16.

Thus, in this embodiment, the auxiliary fuel injected in the state of the intake and exhaust valves being both closed during the exhaust stroke serves as the ignition trigger factor. The compression ignition timing is controlled based on not only at least one of the valve timing and the valve lift amount of the intake valve 19a and the exhaust valve 19b, but also the injection amount of the auxiliary fuel serving as the ignition trigger factor.

While, in the example shown in FIG. 20, the auxiliary fuel 89b and the main fuel 92a are the same fuel injected from the same fuel injection valve, those fuels may differ in type from each other or may be injected as the same one type of fuel or plural different types of fuels from a plurality of fuel injection valves.

Then, in step S107A of FIG. 21, the ECU 1 controls an intake air amount controller 7 and the variable valve mechanisms 15a, 15b so that the conditions decided in step S105A are satisfied.

While the example shown in FIG. 20 employs a throttle as the intake air amount controller, a supercharger may disposed upstream of the throttle for control of the intake amount. After operating the variable valve mechanisms 15a, 15b so as to enclose the burnt remaining gas in the combustion chamber 16, the auxiliary fuel is injected as the ignition trigger factor in step S108A prior to reaching the exhaust top dead center. Subsequently, the main fuel is injected in step S108B.

Then, in step S110, the ECU 1 determines whether the torque generated at that time reaches the demanded torque. If the generated torque does not reach the target torque, the ECU 1 proceeds to step S109, and if it reaches the target torque, the ECU 1 proceeds to step S111.

If the target torque is not reached, the ECU 1 further determines in step S109 whether the ignition timing is normal. Means for detecting the ignition timing is implemented by detecting an ion current generated between electrodes of the ignition plug, or by employing the output value of the knock sensor 25. As an alternative, a pressure sensor for monitoring the pressure history in the combustion chamber 16 may be mounted on the compression ignition internal combustion engine and its output signal may be used to make the above determination.

If the ignition timing is not normal, the ECU 1 returns to step S108 in which the injection amount and the injection timing of the auxiliary fuel serving as the ignition trigger factor are subjected to feedback control so that the ignition timing becomes normal. For example, when the ignition timing is advanced from the target ignition timing, the ECU makes control to reduce the ignition amount of the ignition trigger factor, or to delay the ignition timing of the ignition trigger factor. When the ignition timing is delayed from the target ignition timing, the ECU makes control to increase the ignition amount of the ignition trigger factor, or to advance the ignition timing of the ignition trigger factor.

If the ignition timing is normal, but the generated torque does not reach the target torque, the ECU 1 returns to step S107 in which the intake air amount, the fuel injection amount, and the injection timing are subjected to feedback control so that the target torque is generated.

Also, if it is determined in step S110 that the engine target torque is reached, the ECU 1 determines in step S111 whether the target air-fuel ratio is reached. Means for detecting the air-fuel ratio in this step is implemented by the air-fuel ratio sensor 22 shown in FIG. 1, and the output value of the air-fuel ratio sensor 22 is used to determine the air-fuel ratio during the engine operation.

If the target air-fuel ratio is not reached, the ECU 1 returns to step S107 in which the intake air amount and the fuel injection amount are subjected to feedback control.

If the target air-fuel ratio is reached, the control process is brought to an end. By realizing the target air-fuel ratio as described above, the exhaust cleaning efficiency of the catalyst 12, shown in FIG. 1, can be controlled to an optimum value.

With this embodiment, as described above, the variable valve mechanisms are provided to vary the valve timing of at least one of the intake valve and the exhaust valve. By controlling the variable valve mechanisms such that the intake valve and the exhaust valve are both closed in the exhaust stroke, the burnt gas at a high temperature is caused to remain in the combustion chamber, and a part of the fuel is then injected into the remaining gas so as to serve itself as the ignition trigger factor. This is intended to utilize a property that, when a part of the fuel injected into the high-temperature gas is further compressed, a gas containing a large amount of active chemical species, such as OH radicals, which act to promote ignition without actually causing the ignition, is produced. By controlling a proportion of the fuel injected into the remaining gas with respect to the fuel injected for main combustion, it is possible to control the concentration of the active chemical species acting to promote ignition and hence to control the ignition timing. Stated another way, in this embodiment, the ignition timing can be controlled to an optimum value by controlling the injection timing, the number of times of injections, and the injection proportion of fuel with the use of the fuel injection valve. As a result, a low-cost engine having a good ignition control response can be provided without requiring complicated system modifications and additions. By determining the operating states (such as the ignition timing and the fuel pressure) for each of cylinders on that occasion, it is also possible to control the injection timing, the number of times of injections, and the injection proportion of fuel per cylinder.

Thus, according to this embodiment, the ignition timing can be controlled to an optimum value by controlling the internal EGR rate with the aid of the variable valve mechanisms and by controlling the injection timing, the number of times of injections, and the injection proportion of fuel with the use of the fuel injection valve, while the auxiliary fuel is employed as the ignition trigger factor. Therefore, neither substantial system modifications nor additions of complicated devices are required any longer. Consequently, a low-cost, less-exhaust and more-fuel-economic engine having a good control response can be provided.

As described above, the present invention is featured in that, in the operating mode of compression ignition combustion, the ignition trigger factor is injected during a period in which the intake and exhaust valves are closed, thereby controlling the ignition timing to an optimum value. In addition to the method implemented in the above-described embodiment, any other suitable means and methods for controlling the compression ignition timing by using means for injecting the ignition trigger factor are also involved in the scope of the present invention. Further, when the operating mode with combustion other than the compression ignition combustion is selected, or when the compression ignition timing cannot be controlled to an optimum timing because of a failure or trouble of the ignition-trigger-factor injecting device, it is possible to prevent abnormal combustion, such as misfire or excessively earlier ignition, and to reduce a torque variation per cylinder and per cycle by inhibiting the operation of the ignition-trigger-factor injecting device, i.e., inhibiting the operation with the compression ignition combustion.

Another example of the fuel injection valve used in the compression ignition internal combustion engine according to each of the embodiments of the present invention will be described below with reference to FIG. 23.

Figure 23:
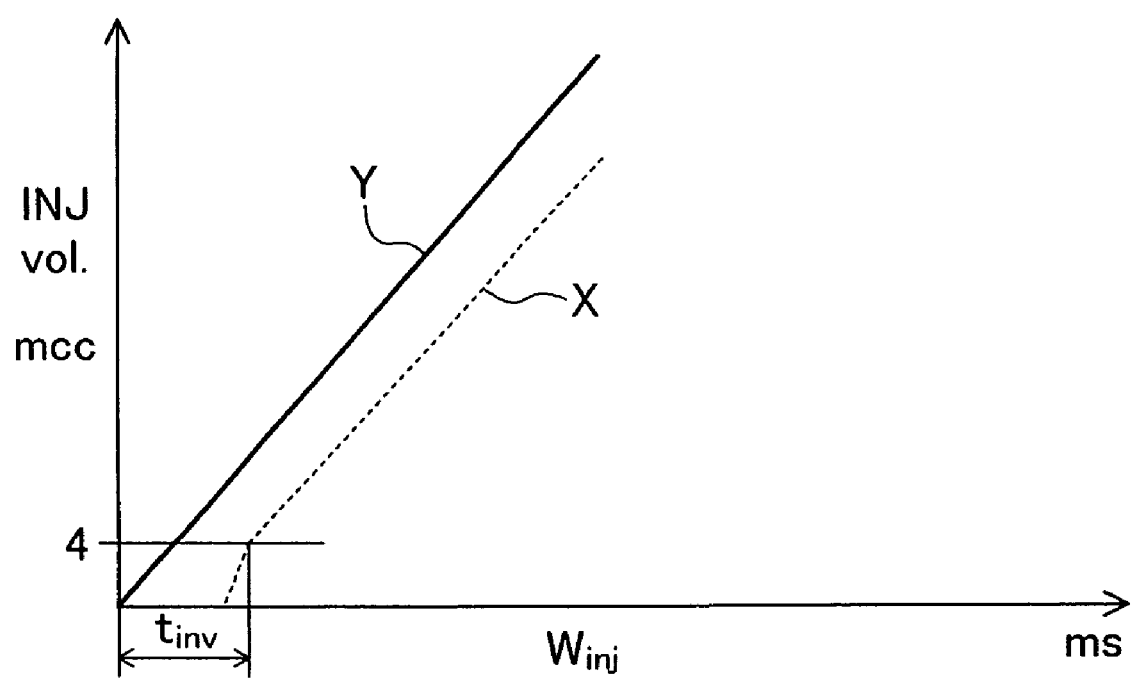
FIG. 23 is a characteristic graph of the fuel injection valve of another example used in the compression ignition internal combustion engine according to each of the embodiments of the present invention.

FIG. 23 is a characteristic graph of the fuel injection valve of another example used in the compression ignition internal combustion engine according to each of the embodiments of the present invention. In FIG. 23, the vertical axis represents a fuel injection amount INJvol and the horizontal axis represents an injection pulse width Winj.

In this example, a piezoelectric device, a magneto-strictive device or the like is employed as an injection valve for injecting the ignition trigger factor, and the injection amounts of the auxiliary fuel and the main fuel are controlled by controlling the value of a voltage and the width of an injection pulse supplied to the injection valve.

In FIG. 23, a dotted line X represents the relationship between the injection pulse width and the injection amount in a conventional injection valve. The term "conventional injection valve" used herein means the type attracting a core valve in the injection valve by using an electromagnet. With such a structure, as shown in FIG. 23, there is a dead injection pulse width $t_{inv}$ when the injection pulse width is narrow, i.e., in a range where the injection amount is small. In such a range, it is difficult to accurately control the fluid injection. When gasoline is injected by using a fuel injection valve currently employed for in-cylinder injection, a minimum injection amount of gasoline capable of being injected once is about 4 mcc.

In contrast, in this example using a piezoelectric device or a magnetostrictive device as the injection valve, the piezoelectric device or the magnetostrictive device deforms depending on the value of the supplied voltage, and the lift amount of the core valve can be controlled correspondingly. As indicated by a solid line Y in FIG. 23, a characteristic including substantially no dead injection pulse width can be obtained. More specifically, in the range of engine low load such as resulting in the idle condition, the injection of the auxiliary fuel requires to be performed in amount of not more than 4 mcc. Even in such a case, by employing the injection valve constituted as a piezoelectric device or a magnetostrictive device, the control accuracy can be improved in the range of engine low load. Note that the fuel injection valve is not limited to one using a piezoelectric device or a magnetostrictive device, and any other suitable fuel injection valve can also be used so long as it is able to inject the fuel in amount of not more than 4 mcc.

INDUSTRIAL APPLICABILITY

According to the present invention, the self-ignition timing can be controlled to a proper timing in a wide engine operating range with respect to a load and a revolution speed without changing the shape of the combustion chamber to a large extent.

The invention claimed is:

1. A control unit for a compression ignition internal combustion engine comprising:
   an input terminal for an accelerator opening signal,
   an input terminal for a brake depressing force signal,
   an input terminal for a vehicle speed,
   a micro computer for judging a compression ignition mode according to at least signals input to said input terminals and calculating at least a target amount of intake air and a target amount of fuel injection,
   a first output terminal for outputting a control output corresponding to an intake air controlling device, and
   a second output terminal for outputting a control output corresponding to said target amount of fuel injection calculated by said micro computer to an fuel injecting device, wherein said micro computer provides a function of calculating an injecting timing and an amount of injection for injecting an air as an ignition trigger factor for promoting an ignition of fuel, and said control unit further comprising a third output terminal for outputting a driving signal to said ignition trigger factor according to said air injecting timing and said amount of air injection.

2. A control unit according to claim 1, wherein a control signal for a throttle valve driving motor for controlling an opening degree of a throttle valve from said first output terminal.

3. A control unit according to claim 1, wherein a control signal for a solenoid mechanism for adjusting a opening/closing timing of an intake air valve from said first output terminal.

4. A control unit according to claim 1, wherein a control signal for an air injecting valve for adjusting an air injecting timing and/or an amount of air injection of said air injecting valve from said third output terminal.

* * * * *